(12) United States Patent
Wright, Jr. et al.

(10) Patent No.: US 12,079,439 B2
(45) Date of Patent: Sep. 3, 2024

(54) SHARED AUGMENTED REALITY SESSION RECORDING AND PLAYBACK

(71) Applicant: PTC Inc., Boston, MA (US)

(72) Inventors: Gerald Wright, Jr., Cardiff, CA (US); John James Lechleiter, Carlsbad, CA (US); Michael Gervautz, Pressbaum (AT); Steffen Gauglitz, San Diego, CA (US); Mathias Kolsch, San Diego, CA (US); Arungundram Mahendran, San Diego, CA (US)

(*) Notice: Subject to any disclaimer, the term of this patent is extended or adjusted under 35 U.S.C. 154(b) by 0 days.

(21) Appl. No.: 17/889,364

(22) Filed: Aug. 16, 2022

(65) Prior Publication Data

US 2022/0398844 A1 Dec. 15, 2022

Related U.S. Application Data

(63) Continuation of application No. 16/618,795, filed as application No. PCT/US2018/035193 on May 30, 2018, now Pat. No. 11,417,091.

(Continued)

(51) Int. Cl.
*G06F 3/048* (2013.01)
*G02B 27/01* (2006.01)
*G06F 3/01* (2006.01)
*G06F 3/04815* (2022.01)
*G06F 3/0488* (2022.01)
(Continued)

(52) U.S. Cl.
CPC ..... *G06F 3/04815* (2013.01); *G02B 27/0101* (2013.01); *G02B 27/0172* (2013.01); *G06F 3/011* (2013.01); *G06F 3/0488* (2013.01); *G06F 3/1454* (2013.01); *G06F 3/167* (2013.01); *G06F 18/22* (2023.01); *G06K 7/1413* (2013.01); *G06K 7/1417* (2013.01); *G06Q 10/20* (2013.01); *G06T 7/20* (2013.01); *G06T 7/74* (2017.01); *G06V 20/20* (2022.01); *H04N 7/147* (2013.01); *G02B 2027/0138* (2013.01); *G06T 2207/10016* (2013.01)

(58) Field of Classification Search
None
See application file for complete search history.

(56) References Cited

U.S. PATENT DOCUMENTS 11,049,072 B1 * 6/2021 Little .................... G06Q 10/10
2017/0280188 A1 * 9/2017 Mullins ............. H04N 21/4302

* cited by examiner

*Primary Examiner* — William C Trapanese
(74) *Attorney, Agent, or Firm* — Outside GC; Alexander Franco

(57) ABSTRACT

Augmented reality (AR) or virtual reality (VR) systems described herein can be configured to record images, video, and/or annotations for concurrent communication to a remote system for display or subsequent access. A communication between a user and an expert user using the system can include an audio communication (unidirectional or bidirectional), a video communication from the user to the expert user (allowing the expert user to see, in real time, the same environment as the user), and a data communication (via which content overlaid over the video communication, such as annotations, may be displayed for both the expert user and the user). The systems can be configured to communicate concurrently while also creating a recording for later review based on a "live" or current issue being faced by a user assisted by an expert where the communication session is recorded for later playback by other users.

19 Claims, 9 Drawing Sheets

Related U.S. Application Data

(60) Provisional application No. 62/512,696, filed on May 30, 2017.

(51) Int. Cl.
*G06F 3/14* (2006.01)
*G06F 3/16* (2006.01)
*G06F 18/22* (2023.01)
*G06K 7/14* (2006.01)
*G06Q 10/20* (2023.01)
*G06T 7/20* (2017.01)
*G06T 7/73* (2017.01)
*G06V 20/20* (2022.01)
*H04N 7/14* (2006.01)

LOCAL USER A
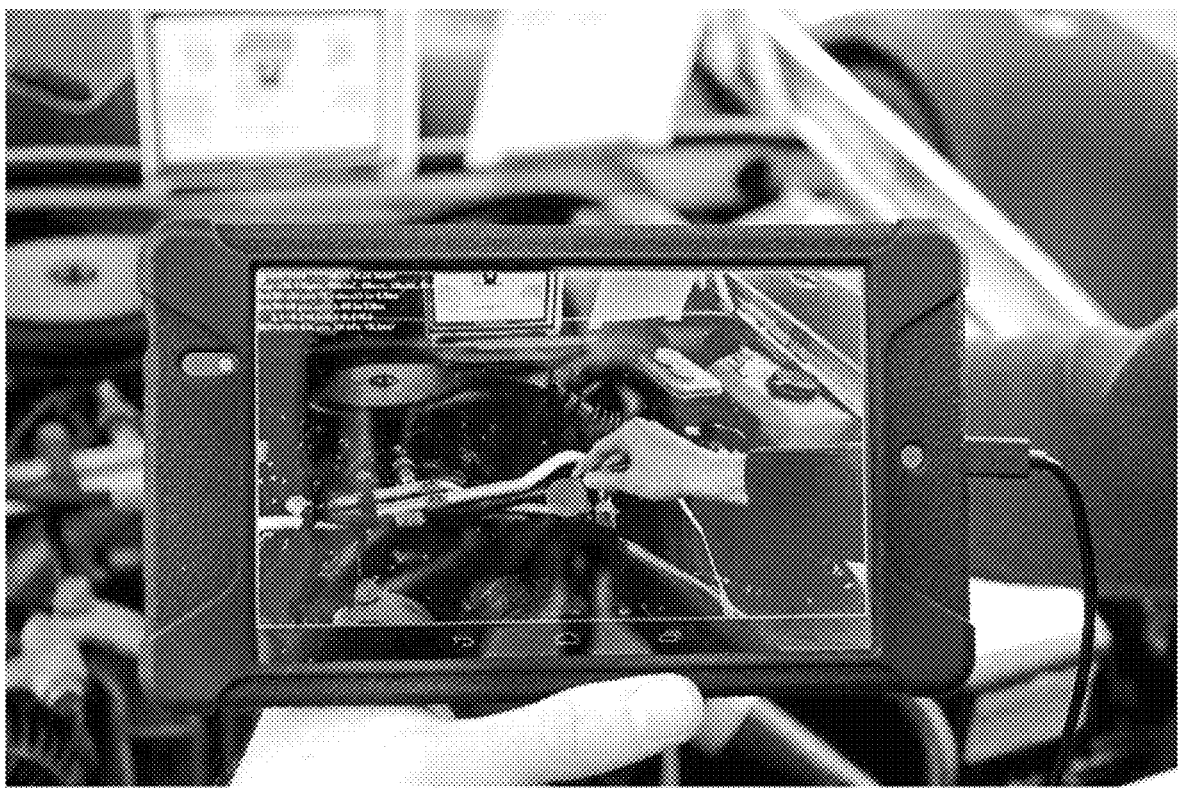
REMOTE USER B
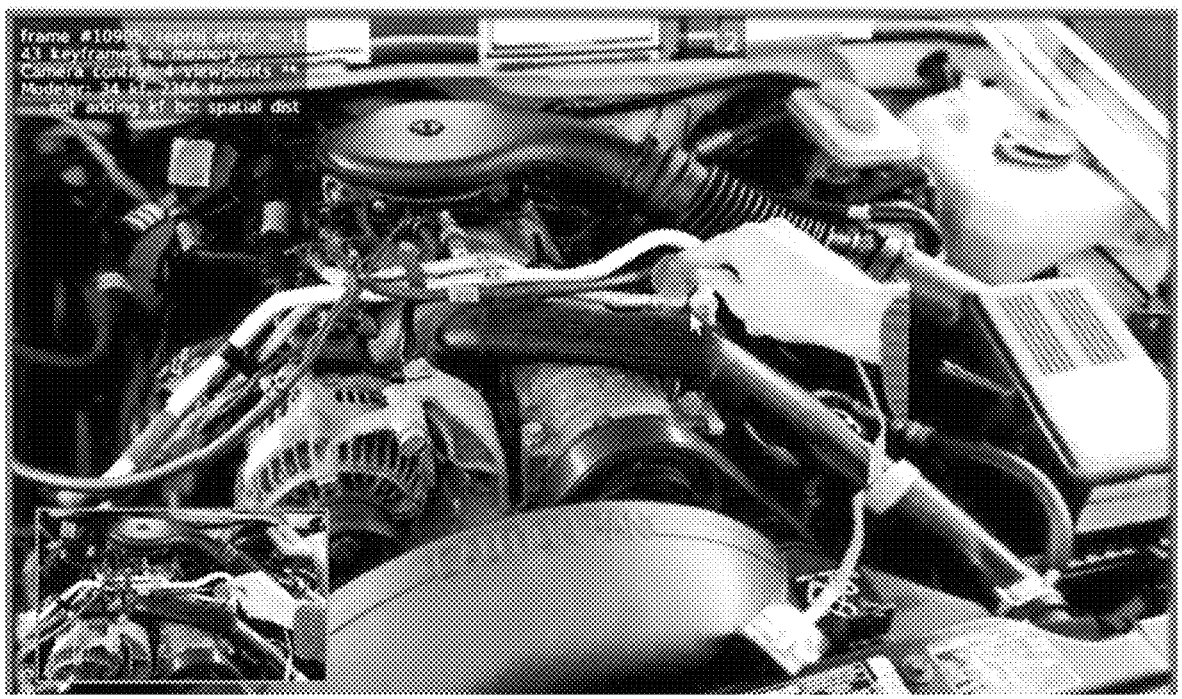
FIG. 3

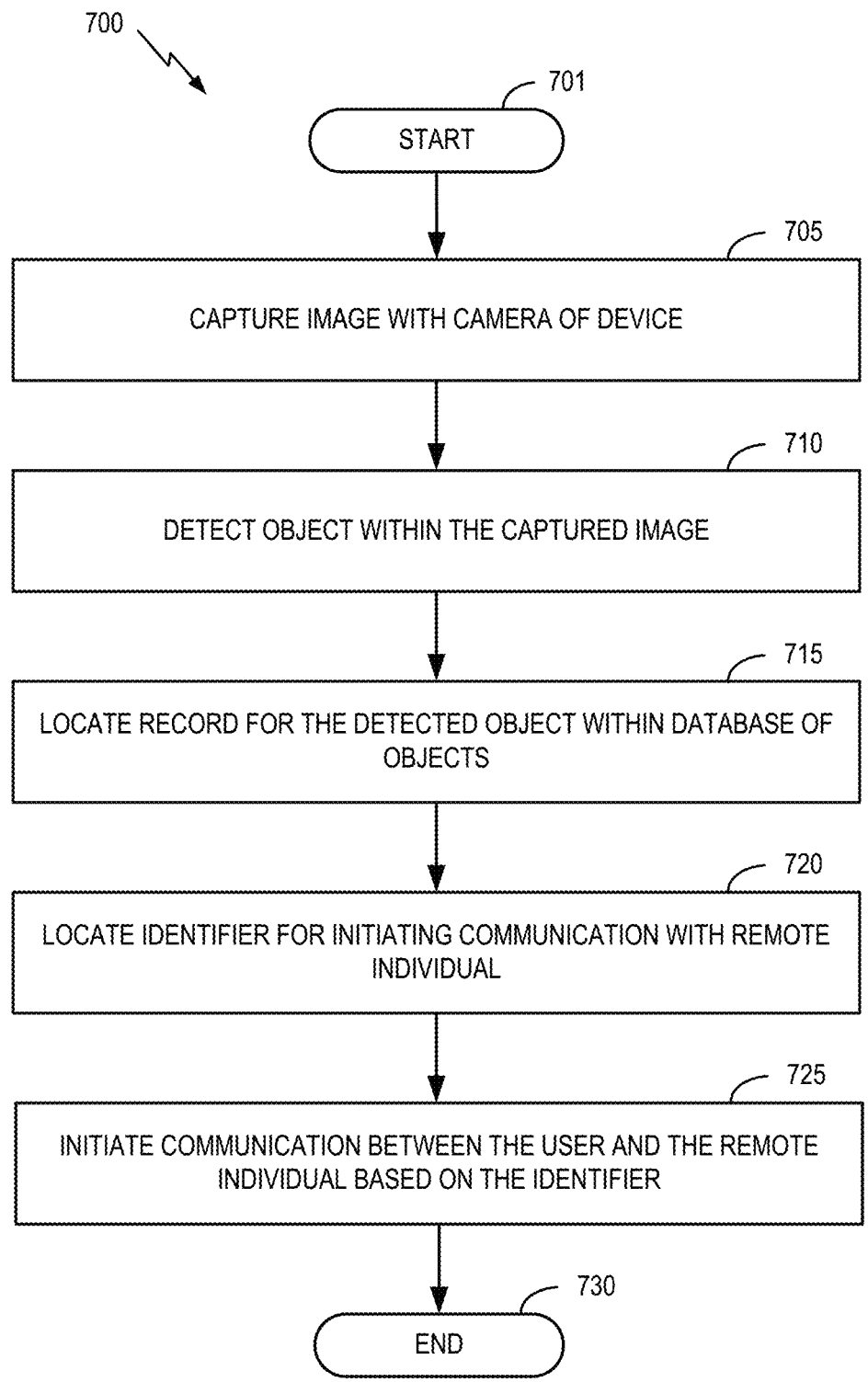

SHARED AUGMENTED REALITY SESSION RECORDING AND PLAYBACK

RELATED APPLICATIONS

The subject matter of this application is related to U.S. Utility patent application Ser. No. 16/618,795, filed 2019 Dec. 2, now U.S. Pat. No. 11,417,091, Patent Cooperation Treaty Application PCT/US2018/035193, filed on 2018 May 30, U.S. Utility patent application Ser. No. 15/993,550, filed 2018 May 30, and U.S. Provisional Application No. 62/512,696, filed on 2017 May 30, all of which applications are hereby incorporated by reference.

BACKGROUND OF THE INVENTION

A user may require and/or desire technical or other assistance in interacting with physical object(s) in his/her environment. Traditionally, a user would solve technical issues by consulting written documentation describing the typical issues that may arise from malfunction of the object along with the typical indicators associated with the object/malfunction and solutions to those issues. However, there may be limitations in consulting written documentation to solve these types of issues. For example, rare issues may not be included in the written documentation, leaving the user unable to diagnose and/or solve these issues using the written documentation alone. Additionally, the written documentation may be outdated, providing solutions to the issues which are no longer the most up-to-date solutions to the issues. Further, when the user does not have a sophisticated understanding of the object and its potential issues, the user may not be able to fully understand the written documentation due to assumptions in knowledge in the documentation and/or the use of technical jargon.

The user may also be able to call a third-party user (also referred to hereinafter as a remote user or remote individual) and/or an automated system for assistance in interacting with the object. A phone call to a third-party may solve some of the problems associated with written documentation by providing recently updated diagnosis/solution information related to the object. However, the user may not have readily available access to the contact information for the third-party. That is, the user may not be able to determine, from inspecting the object alone, which third-party to contact to obtain assistance with the object. Thus, the user may be required to determine which third-party is available and able to assist the user in interacting with the object and find the contact information for the third-party. These additional steps may require a non-trivial amount of time for the user.

Moreover, a voice call may have certain limitations in the type of assistance available to the user. For example, the local user may not be able to accurately describe the object and/or the issues that the user is experiencing with the object. The local user may also not understand the terminology used by the remote user in describing actions to take to address the issues. Since the remote user is unable to see the object when assisting via a voice phone call, it may be difficult for the user and the remote user to efficiently communicate in a manner which is understandable by both parties.

SUMMARY OF THE INVENTION

Augmented reality (AR) or virtual reality (VR) systems described herein can be configured to record images, video, and/or annotations for concurrent communication to a remote system for display or subsequent access. A communication between a user and an expert user using the system can include an audio communication (unidirectional or bidirectional), a video communication from the user to the expert user (allowing the expert user to see, in real time, the same environment as the user), and a data communication (via which content overlaid over the video communication, such as annotations, may be displayed for both the expert user and the user). The systems can be configured to communicate concurrently while also creating a recording for later review based on a "live" or current issue being faced by a user assisted by an expert where the communication session is recorded for later playback by other users.

BRIEF DESCRIPTION OF THE DRAWINGS

FIG. 3 illustrates an example operation of an AR-based remote collaboration system.

FIG. 7 illustrates a method for initiating communication between a local user and a remote user based on the detection of an object in the local user's environment.

DETAILED DESCRIPTION

In the following description, references are made to various embodiments in accordance with which the disclosed subject matter can be practiced. Some embodiments may be described using the expressions one/an/another embodiment or the like, multiple instances of which do not necessarily refer to the same embodiment. Particular features, structures or characteristics associated with such instances can be combined in any suitable manner in various embodiments unless otherwise noted.

Shared Augmented Reality System Platform

Augmented reality systems may enable a more natural and efficient communication system between two parties. A shared augmented reality (shared AR) system implementation may support sharing images and/or video captured by the local user with a remote user or remote individual. At least one of the local user and the remote user may be able to add annotations (e.g., markings, notes, drawings, etc.) to certain objects within the environment captured within the images and/or video. These annotations and the shared images and/or video may improve the communication between the local user and the remote user by, for example, allowing the local user and the remote user to visually identify specific objects in the local user's environment. Some example shared AR systems are described in U.S. Patent Application Publications 2015/0125045 and 2016/0358383.

Figure 1:
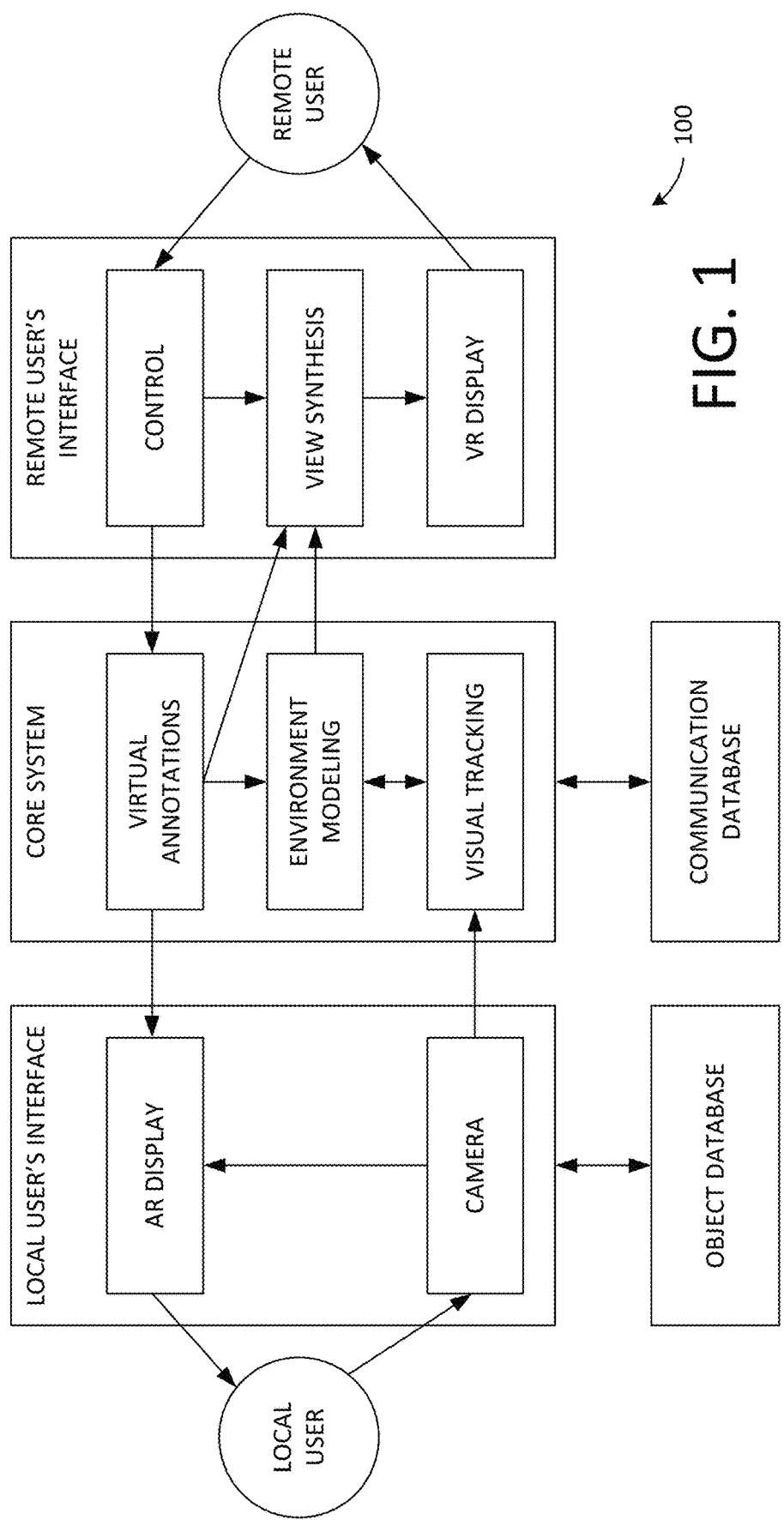
FIG. 1 illustrates an example shared AR system platform 100 that can be used as platforms to support various embodiments.

FIG. 1 illustrates an example shared AR system platform 100 that can be used as platforms to support various embodiments disclosed herein. In particular, FIG. 1 illustrates an example system for a particular example application that enables a remote user to explore a physical environment via live imagery from a camera that the local user holds or wears, such as a camera of a mobile device or a wearable computing device, which may be or include a networked, wearable camera. The remote user is able to interact with a model fused from images captured from the surroundings of the local user and create and add virtual annotations in it or transfer live imagery (e.g., of gestures) back. The example system is an example of a system on which various embodiments may be implemented. Further, the various method and portions thereof, may be performed on one or more of the various computing devices, on a cloud, network-based server, on a local or remote user's computing device, and various combinations thereof. The example system platform illustrated in FIG. 1 is just one of many possible system platforms on which the various AR embodiments herein may be implemented.

The system illustrated in FIG. 1 can support live mobile tele-collaboration. The system can include a tracking and modeling core, which enables the system to synthesize views of the environment and thus decouple the remote user's viewpoint from that of the local user, giving the remote user some control over the viewpoint, and to register virtual annotations to their real world referents. Note, however that this is a particular example application, and not all embodiments include virtual annotation, model viewing, or model navigation functionality.

This system is compatible with hardware devices and systems that are already ubiquitous (e.g., smartphones), but also scales to more advanced high-end systems, including augmented reality, mixed reality and virtual reality (VR) devices. Further, some embodiments are compatible with various types of displays for the local user, including eye-worn, head-worn and/or projector-based displays.

In the illustrated embodiment of the FIG. 1, the local user may hold or wear a device that integrates a camera and a display system (e.g., hand-held tablet, mobile device, digital eyewear, or other hardware with a camera), which is used to both sense the environment and display visual/spatial feedback from the remote user correctly registered to the real world. In the case of a hand-held device, the handheld device acts as sort of a "magic lens" (i.e., showing the live camera feed and virtual annotations, when the embodiment includes AR). Since a collaboration system typically aids the user an actual task being performed rather than distracts from it, an interface which is simple and easy to comprehend is typically provided such as to facilitate an active user who may be looking at and working in multiple areas.

A device of the remote user may also be a mobile device, such as a handheld computer, a tablet, a smartphone, and the like. However, the device of the remote user may also or alternatively be any computing device, such as a personal computer, a wearable computing device, and the like. The remote user, in some embodiments, is presented with a view into the local user's environment, rendered from images obtained by the local user's camera. The remote user, in augmented reality embodiments, can place annotations that will be displayed to both users, correctly registered to their real-world referents from their respective points of view. Annotations may include point-based markers, more complex three-dimensional annotations, drawings, or live imagery, such as hand gestures.

In a simple embodiment, the remote user's viewpoint may be restricted to being identical to the local user's current camera view. In such embodiments, little image synthesis is needed. However, the remote user may be permitted be able to decouple a presented viewpoint and control the viewpoint independently, as far as supported by the available imagery of the environment. In such embodiments where the system allows for decoupled views, only the viewpoint is decoupled; the video is still synthesized and updated from live images to enable consistent communication.

Figure 2:
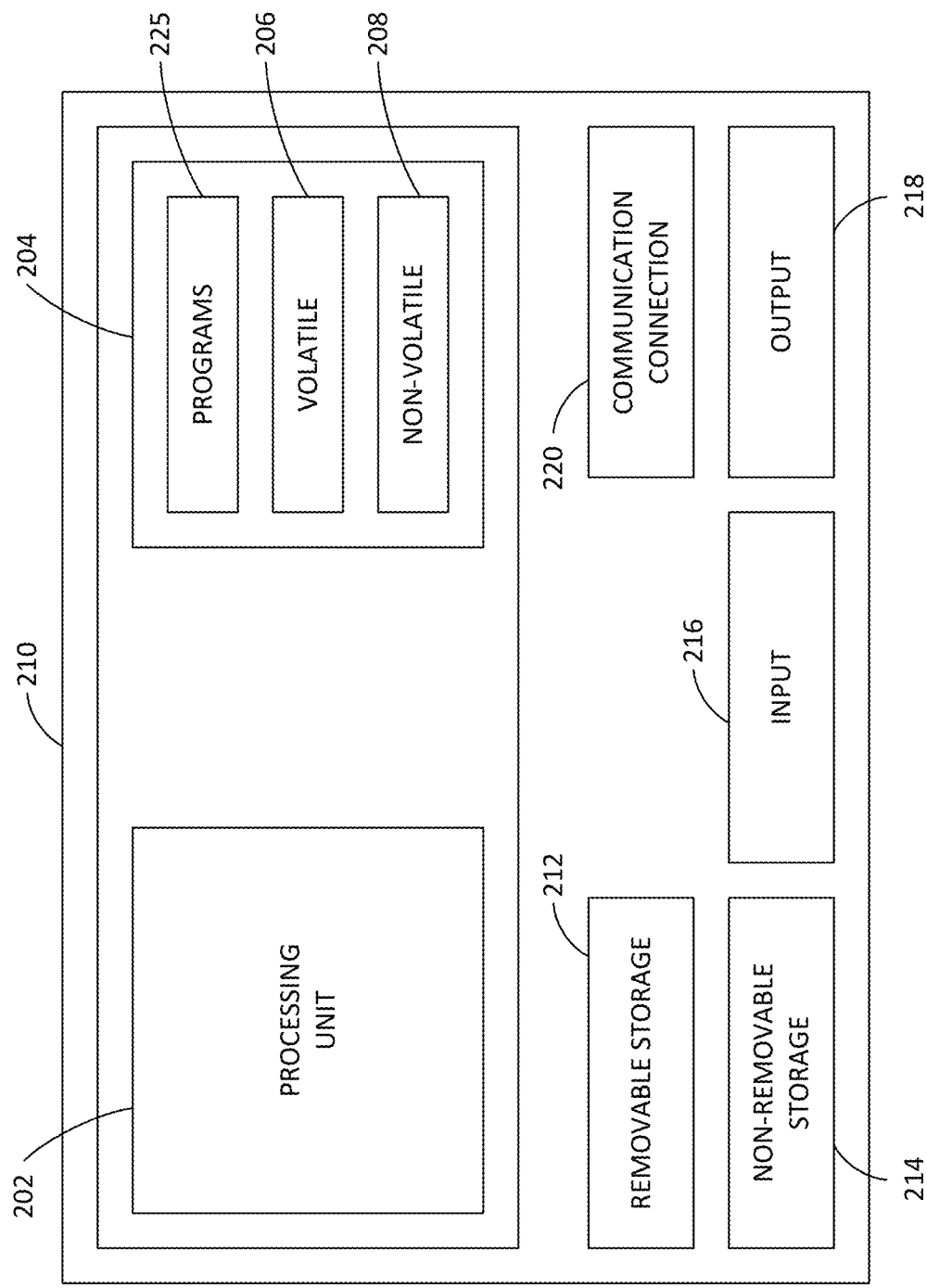
FIG. 2 illustrates an example computing device that can be used to support various systems and methods disclosed.

FIG. 2 illustrates an example computing device that can be used to support various systems and methods disclosed. The computing device of FIG. 2 may be implemented as one or more of the computing devices of the local user's interface, core system, and remote user's interface as illustrated and described with regard to FIG. 1.

In one embodiment, multiple such computer systems are utilized in a distributed network to implement multiple components in a transaction-based environment. An object-oriented, service-oriented, or other architecture may be used to implement such functions and communicate between the multiple systems and components. One example computing device in the form of a computer 210 may include a processing unit 202, memory 204, removable storage 212, and non-removable storage 214. Although the example computing device is illustrated and described as computer 210, the computing device may be in different forms in different embodiments. For example, the computing device may instead be a smartphone, a tablet, smartwatch, another wearable computing device type, or other computing device including the same, similar, fewer, or more elements than illustrated and described with regard to FIG. 2. Devices such as smartphones, tablets, and smartwatches are generally collectively referred to as mobile devices. Further, although the various data storage elements are illustrated as part of the computer 210, the storage may also or alternatively include cloud-based storage accessible via a network, such as the Internet.

Returning to the computer 210, memory 204 may include volatile memory 206 and non-volatile memory 208. Computer 210 may include or have access to a computing environment that includes a variety of computer-readable media, such as volatile memory 206 and non-volatile memory 208, removable storage 212 and non-removable storage 214. Computer storage includes random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 210 may include or have access to a computing environment that includes input 216, output 218, and a communication connection 220. The input 216 may include one or more of a touchscreen, touchpad, one or more cameras, mouse, keyboard, one or more device-specific buttons, one or more sensors integrated within or coupled via wired or wireless data connections to the computer 210, and other input devices. The input 216 may further include inertial measurement unit (IMU), which may include an accelerometer and/or a gyroscope. As discussed below, the computer 210 may use the camera and/or the IMU to determine whether the computer has been put down (e.g., placed on a surface such as a table) or placed in the local user's pocket or a bag. The computer 210 may operate in a networked environment using a communication connection 220 to connect to one or more remote computers, such as database servers, web servers, and other computing device. An example remote computer may include a personal computer (PC), server, router, network PC, a peer device or other common network node, or the like. The communication connection 220 may be a network interface device such as one or both of an Ethernet card and a wireless card or circuit that may be connected to a network. The network may include one or more of a Local Area Network (LAN), a Wide Area Network (WAN), the Internet, and other networks. In some embodiments, the communication connection 220 may also or alternatively include a transceiver device, such as a Bluetooth device that enables the computer 210 to wirelessly receive data from and transmit data to other Bluetooth devices.

Computer-readable instructions stored on a computer-readable medium are executable by the processing unit 202 of the computer 210. A hard drive (magnetic disk or solid state), CD-ROM, and RAM are some examples of articles including a non-transitory computer-readable medium. For example, various computer programs 225 or apps, such as one or more applications and modules implementing one or more of the methods illustrated and described herein or an app or application that executes on a mobile device or is accessible via a web browser, may be stored on a non-transitory computer-readable medium.

FIG. 3 illustrates an example operation of an AR-based remote collaboration system. A local user is located in physical location A, while a remote user is located in physical location B. FIG. 3 shows a physical view of the local user in location A in front of a car engine, identifying a particular element with his hand. FIG. 3 also shows a screen view of the remote user in location B onto the scene in physical location A, which (at this moment) shows more surrounding context than the more limited view on the screen of the user in location A. The local user's view is shown as an inset on the bottom left of the remote user's view as well as being projected onto the model as viewed by the remote user. The user in location B can browse (e.g. pan, tilt, zoom) this environment independently of the current pose of the image capture device in physical location A, and can set annotations, which are immediately visible to the user in physical location A in AR. In this case, the remote user in location B has virtually marked the element identified by the local user in location A in the screen view of the scene using a virtual circular marker that is also visible to the local user A.

The above-describe shared AR system platform supports an augmented shared visual space for live mobile remote collaboration on physical tasks. The user in physical location B can explore the scene independently of the current pose of the image capture device in physical location A and can communicate via spatial annotations that are immediately visible to user in in physical location A in AR. This system can operate on off-the-shelf hardware and uses real-time visual tracking and modeling, thus not requiring any preparation or instrumentation of the environment. It can create a synergy between video conferencing and remote scene exploration under a unique coherent interface.

Object Initiated Communication

A user of an electronic device (also referred to herein as a "local user") may require and/or desire assistance in interactive with object(s) in the local user's environment. Certain embodiments of this disclosure relate to systems and techniques for initiating communication between two electronic devices or between one electronic device and a remote party based on object detection performed by one of the devices. This assistance may take the form of a phone call to a help desk/automated system, a text-based chat session, a shared augmented reality communication session, etc. The user may be able to communicate with a third-party (e.g., a remote user and/or automated electronic system) to receive assistance with any issues the user may be experiencing with the object(s) to diagnose the source of the issues and/or provide instructions to the individual to aid in the interaction with the object. The object(s) and/or type of communication may vary depending on the user's circumstances. For example, the user may be performing maintenance on an engine of a vehicle and may encounter object(s) within the engine having issues that the user is unable to diagnose and/or address.

The described technology is not limited to a specific type of object for interaction with the user. That is, similar limitations may exist for user interaction with object(s) other than the engine of a vehicle. A non-exhaustive list of such objects include: assembly of furniture and/or electronic devices, performing maintenance on machinery, diagnosing and/or troubleshooting mechanical errors, etc.

Augmented reality systems can be programmed to automatically locate and identify objects from within the view of the images captured by a camera of an electronic device (e.g., a mobile phone, table computer, "virtual looking glass", etc.). There are a number of different methods for object detection.

Figure 4:
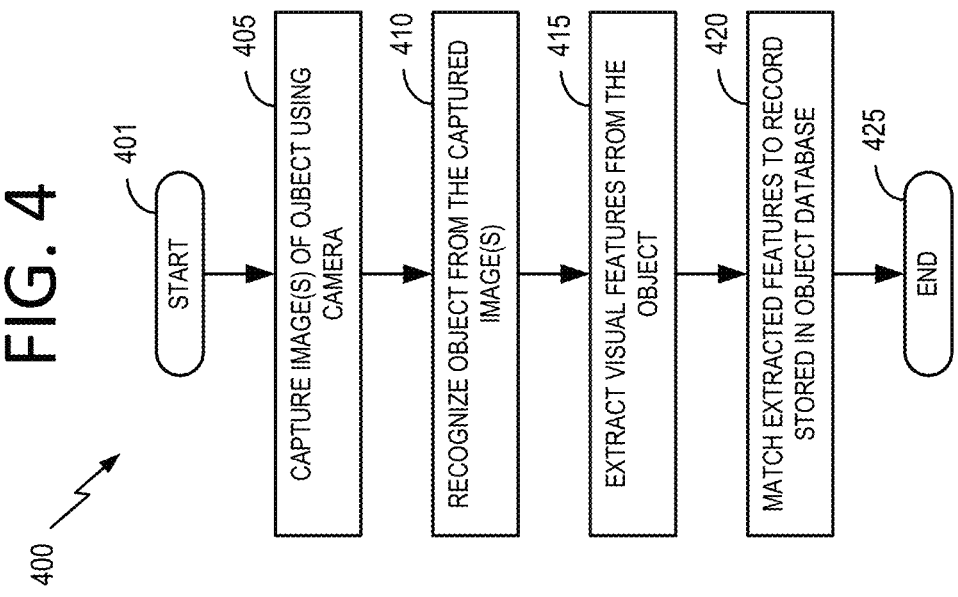
FIG. 4 illustrates a method for identifying an object and matching the detected object to a record stored in an object database.

FIG. 4 illustrates a method 400 for identifying an object and matching the detected object to a record stored in an object database. As used herein, an object may refer to an entire physical object or a portion of a physical object which is visually identifiable based on an image of the portion. In certain embodiments, the object can include a machine-readable code (such as a graphical marking), which may be printed on the object to facilitate identification of the object. One or more of the steps illustrated and described in connection with the method 400 may be omitted and/or performed in a different order to the described order without departing from this disclosure.

Method 400 may be performed by a processor, such as processor unit 202. The method 400 begins at block 401. At block 405, one or more image(s) including at least a portion of an object are captured using a camera. At block 410, the processor recognizes the object from the captured image(s). That is, the processor may recognize that the captured image includes an object which can be identified from an object database. In one implementation, this may include highlighting or otherwise visually identifying the recognized object. When more than one object is present in the image(s), each of the objects may be visually identified. The user may select, via a user interface, one or more of the objects to be matched with a record in the object database. Alternatively, the processor may identify an object without visually identifying the object via a display. In certain implementations, the processor may automatically select one of the objects to be matched with a record in the object database based on at least one of: the object's size, the object's position within the image, etc.

The identification of an object may also include identifying a plurality of objects to be matched with a record in the object database. For example, a plurality of objects may be related in some way such that they may be considered a set of objects that could match a single record in the object database. In one example, the user may wish to receive assistance with assembling a piece of furniture. However, prior to assembly, the furniture may include a plurality of different objects that are to be attached to one another in order to assemble the furniture. In this case, the processor may identify the plurality of objects as related so as to match the plurality of objects together with a single record stored in the object database.

At block 415, the processor may extract visual features from the identified object. The visual features may be any aspect of the object that can be extracted based on the information in the image(s) captured by the camera. This may include: the two-dimensional (2D) and/or three-dimensional (3D) shape of the object, a graphical marking (e.g., machine-readable code) on the object which encodes data, image recognition (e.g., an image printed on the object or the image of the object itself), CAD-model based data (e.g., shapes and/or features of the object that may be matched to a CAD-model of the object), geo-location data (e.g., when the object is located at a unique location), etc.

In certain embodiments, the extracted visual features can be characteristic data that can be used to identify the object based on matching the characteristic data to a record of an object stored in an object database. The object database may be stored locally on the electronic device or may be stored on a remote server accessed over a network such as the Internet (also referred to as being stored in the "cloud"). The processor may extract one or more of the visual features in order to use more than one type of visual feature in matching the object to a record in the object database or to search more than one object database.

In certain embodiments, the extracted visual features can include a machine-readable code. In some embodiments, the machine-readable code can be capable of being algorithmically decoded without a database lookup, such as a traditional barcode or a QR code. In some embodiments, the machine-readable code may require a database lookup in order to be decoded, such as a Vuforia™ VuMark™, available from applicant, PTC Inc. The database can include records defining formats for identifying and decoding various types of machine-readable codes.

At block 420, the processor can attempt to match the extracted visual features to records of objects stored in the object database. This may include the processor accessing the object database and locating a record in the database that matches the extracted visual features. In response to the visual features matching one of the records stored in the object database, the processor may highlight the object on the display or otherwise indicate to the user that an object has been detected and identified.

In some implementations, the extracted visual features may not be sufficient for matching a record within the database or may only broadly identify the object but not have specific information about the object. For example, when matching a record in the object database based on the shape of the object, the model of the object may be identified. However, the identified object model may have been manufactured over a number of years in different batches and using different methods and/or materials, some of which may affect how the user interacts with the object. In order to gather more specific information, the user may be able to scan a further graphical marking or machine-readable code printed on the object to obtain more specific information.

In one embodiment, the electronic device may prompt the user to scan the graphical marking or machine-readable code printed on the object. This may include displaying a location on the object where the graphical marking may be found. For example, if the object is lying on the ground such that the graphical marking is obscured from the user's view, the user may not be aware that a graphical marking is present on the object. Thus, the display of the graphical marking's location may prompt the user to rotate the object and/or move the electronic device such that the graphical marking may be found. The graphical marking may encode information about the object, such as the object's serial number, manufacture date, batch number, etc. Based on this additional information, the object database may be able to access information that can assist the user in interacting with the object. For example, the manufacture date and/or batch number of the object may indicate that the object was manufactured during a batch that was later identified as having manufacturing errors, which may indicate that the object is faulty and required replacement. After decoding the graphical marking, the electronic device may send the decoded information to the remote user's computer system. Thus, the remote user may be able to use this information in assisting the user.

After an object has been detected by the user's electronic device, the user may be able to interact with the object in a number of ways. In one implementation, the object may be highlighted on a display associated with the electronic device and the user may be able to select the object to bring up a menu of options to interaction with the object within an AR environment. The menu may be able to display information associated with the object, such as the name, model, part number, owner, serial number, or a unique identifier, etc. The menu may also include an option to display stored history associated with the object, such as past communications sessions for help or service, operating specifications/parameters, and other real-time diagnostic data. The historical data may be stored on a remote server in the cloud.

The menu may also display a list of options for the user to obtain assistance for the identified object. These options may include option for: a phone call with a corresponding phone number, a shared AR session, a text-based chat session, or another type of person-to-person communication. The assistance options may also include options for obtaining assistance instructions and/or troubleshooting techniques for interacting with the object. The user may follow the steps associated with the assistance instructions and/or troubleshooting techniques prior to initiating a communication session with a remote individual. Another option which may be displayed by the menu is link(s) to any previously recorded communication sessions relevant to the identified object that can be replayed. These recorded sessions may be stored locally and/or in the cloud.

Figure 5:
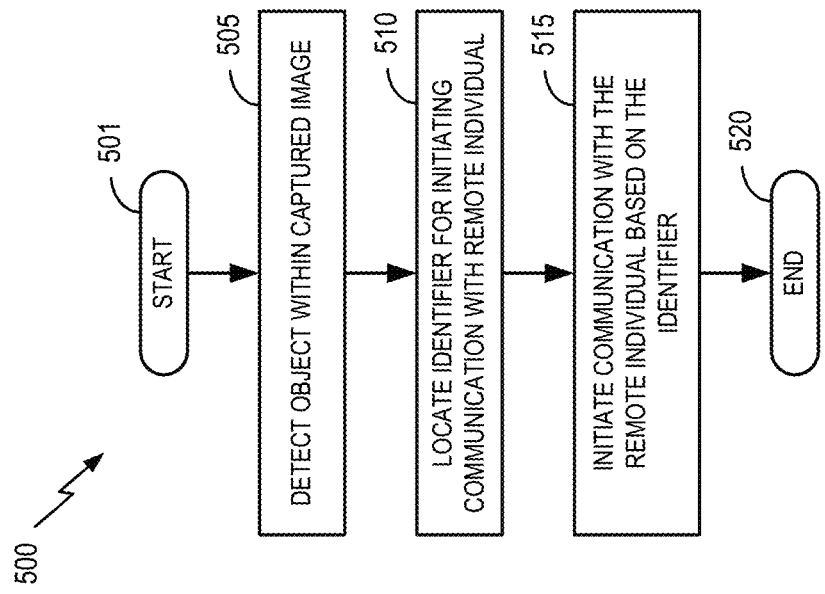
FIG. 5 illustrates a method for initiating communication with a remote user based on object detection.

FIG. 5 illustrates a method 500 for initiating communication with a remote user based on object detection. Method 500 may be performed by a processor, such as processor unit 202. The method 500 begins at block 501. At block 505, the processor detects an object within a captured image. This may be performed by the local user's electronic device. Once the object has been detected by the electronic device, the device can provide an indication to the user that the object has been detected, such as by presenting an augmented reality overlay corresponding to the object as shown on a display of the device. The device can also present to the user a number of options for interacting with the detected object, where those options can include initiating a live communication session with a remote user or party. At block 510, the processor may locate contact information (also referred to as an identifier for initiating a communication session with a remote user) by searching a second database (hereinafter also referred to as a communication database). The identifier for initiating a communication session may identify an address for initiating the communication session. For example, the address may be an IP address, a phone number, etc. Similar to the object database, the communication database may be stored locally on the electronic device or may be stored in the cloud. Once the identifier is located, the device may either automatically initiate communication with the remote individual or may prompt the user to request input regarding whether the user would like to initiate the communication.

A key for searching the communication database may be retrieved from the record associated with the identified object stored in the object database. The key may be identifier of the object (e.g., a unique object identifier) that can be used to locate the corresponding record in the communication database. Thus, the processor may access the communication database using information from the matching record retrieved from the object database. Once the record for the object has been located in the communication database, the electronic device may obtain an identifier for initiation a communication session from the record. At block 515, the electronic device may then initiate communication with the remote individual based on the retrieved identifier. The method ends at block 520.

The communication session may be any type of real-time communication between the user and the remote individual. For example, the user may initiate a shared AR session with the remote individual in which a live video stream or sequence of images captured by a camera of the user's electronic device is transmitted to a remote user's interface (e.g., a remote computer system or other device capable of displaying the video stream or sequence of images). As discussed in detail above, one or more of the local user and the remote user may communicate verbally and/or by annotating objects within the environment which are displayed by either the local user's electronic device or the remote user's interface. The shared AR session may involve motion tracking so that the core system is able to track the environment as the electronic device is moved by the local user. In certain implementations, the motion tracking is performed using the object identified by the processor as a known point about which motion may be tracked.

In other implementations, the communication session may be a phone call, a VOIP call, a text-based chat session, etc. These types of communication sessions may also be integrated to an AR session which is only displayed to the local user (e.g., the video stream is not transmitted to the remote user). In certain situations, the user may not be connected to a data network that has sufficient bandwidth to transmit data, and thus, may not be able to establish an AR session with the remote user. Thus, the user may establish a local AR session that is not viewable by the remote user. The local AR session may be established prior to initiating the communication session and/or prior to identifying an object.

As discussed above, the user may follow the steps associated with the assistance instructions and/or troubleshooting techniques prior to initiating a communication session. Information relating to the user's progress through the steps may be transmitted to the remote user upon establishing the communication session. This may aid the remote user in determining what actions the local user has already taken prior to initiating the communication session, thereby enabling the remote individual to understand the specific issues facing the local user without requiring the remote user go through all of these steps again with the local user. In one implementation, the remote user may follow a predetermined set of instructions to guide the local user through a troubleshooting process. In response to receiving the steps that the user has already performed, the remote user's computer may skip these steps, resulting in a more efficient use of time for both the local and remote users.

The remote user may also receive other information from the local user's electronic device in response to the initiation of the communication session that is helpful in assisting the local user. This information may include information associated with the object, such as the name, model, part number, owner, serial number, or other unique ID, etc.; and historical information associated with the object, such as past communications sessions for help or service, operating specifications/parameters, and other real-time diagnostic data.

Figure 6B:
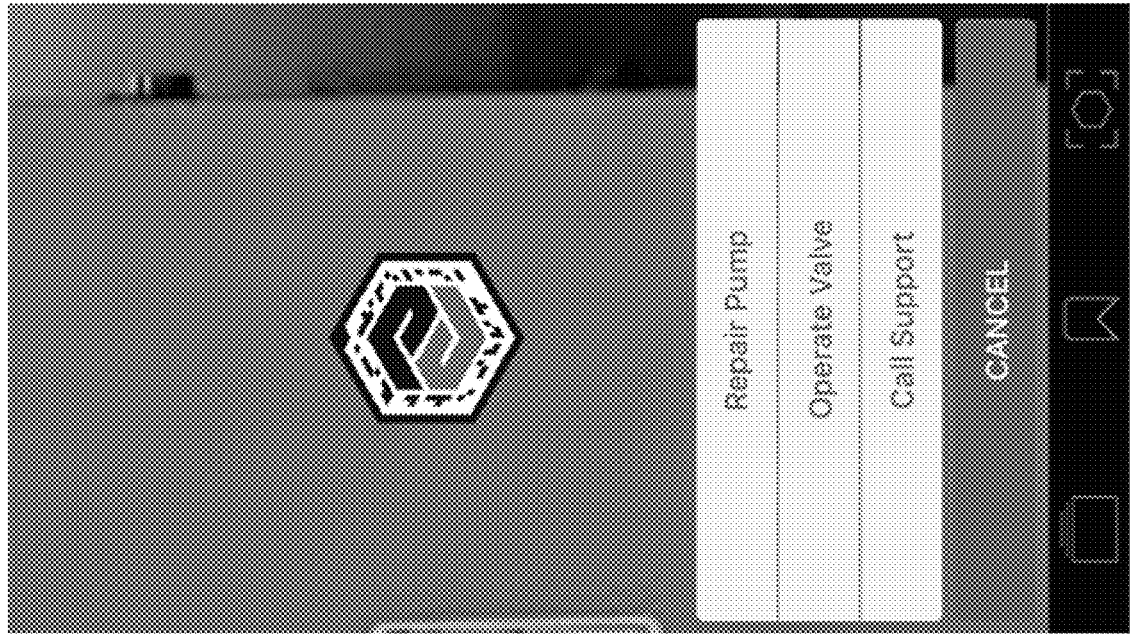
FIGS. 6A to 6E illustrate a local user interface displayed via a display of the electronic device in accordance with one embodiment.
Figure 6A:
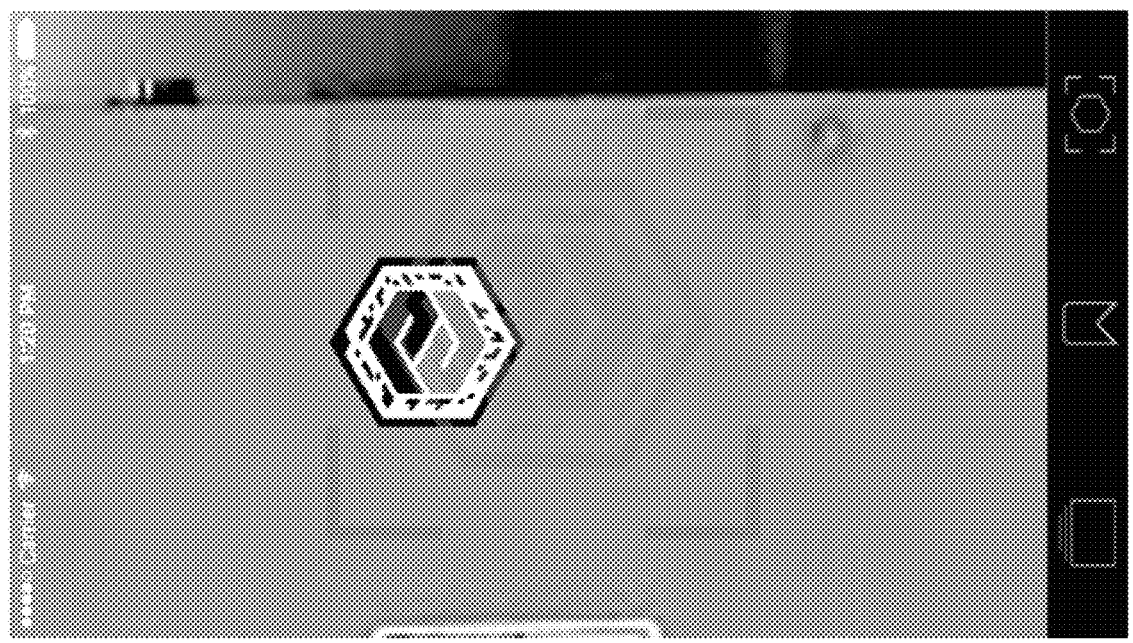

FIGS. 6A to 6E illustrate a local user interface displayed via a display of the electronic device in accordance with one embodiment. FIG. 6A illustrates the user preparing to line up a graphical marking on an object with the camera of the electronic device. After the graphical marking has been scanned, a portion of the graphical marking may be highlighted, as shown in FIG. 6B, to provide the user with a visual confirmation that the graphical marking has been scanned. The display may also provide the user with a list of options for interacting with the object via AR. The option to initiate a support call, based on the detected object, is also shown in FIG. 6B.

Figure 6D:
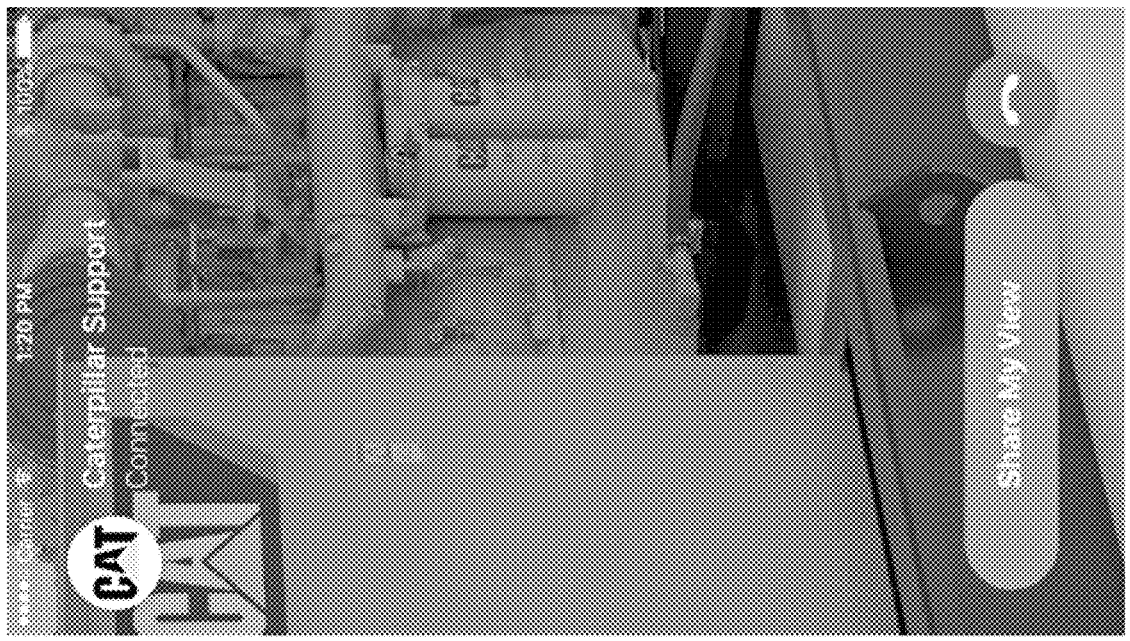
Figure 6C:
Figure 6E:

FIG. 6C illustrates a display after the user has selected the option to call support. Once the call to support has been established, as shown in FIG. 6D, the user may be given the option to share the user's view, thereby transitioning the call to an AR communication session. FIG. 6E illustrates an example annotation that may be anchored to an object in the environment. The annotation may be added by either the local user or the remote user and displayed on the electronic device.

In the illustrations of FIG. 6A to 6E, the graphical marking shown is a VuMark™ machine-readable code. VuMark™ machine-readable codes and their associated programs, applications and systems, were released in August 2016 under the Vuforia™ brand by the Applicant, PTC Inc. More generally, a user-designed, machine-readable code, also referred to herein as a target, is printed or otherwise disposed on an object in order to support one or both of machine-reading of encoded data from the code and machine-determination of the position and orientation of the object. The user-designed, machine-readable code can deliver a unique augmented reality experience on any object and/or enable the machine-reading of encoded data while allowing design freedom for a custom look and feel of the code itself. The form and visual representation of the user-designed code can be highly flexible, with the ability to support visually appealing graphics, logos and designs. The user-designed code overcomes the limitations of existing bar code solutions that do not support augmented reality experiences and can detract from a product's appearance. The user-designed code supports encoding varying amounts and kinds of data such as URLs or a product serial numbers. The user-designed code can be designed to distinguish any number of objects or products, since the range of the encoded data can be a user-determined design parameter. A single template for a user-designed code can be used to encode multiple instances of the code where each instance encodes different data. The user-designed code can be detected and tracked, for example, with a mobile device with a camera. Position and orientation within a camera image can be determined automatically, so the user-designed code can be used for tracking an object, such as within an augmented reality application.

Although in the illustrations of FIGS. 6A to 6E, the graphical marking is user-designed, machine readable code, any appropriate machine-readable code can be used to identify the object or provide a link to a database to support initiation of communication. Certain machine-readable codes can also support object identification and/or object tracking.

FIG. 7 illustrates a method 700 operable by an electronic device, or component(s) thereof, for initiating communication between a local user and a remote user based on the detection of an object in the local user's environment. For example, the steps of method 700 illustrated in FIG. 7 may be performed by a processor, e.g., processing unit 202, of the electronic device. For convenience, the method 700 is described as performed by a processor of a local user's electronic device.

The method 700 begins at block 701. At block 705, the processor captures an image with a camera of the device. At block 710, the processor detects an object within the captured image. At block 715, the processor locates a record for the detected object within a database of objects. At block 720, the processor locates an identifier for initiating communication with a remote individual. The identifier may be associated with the record of the detected object. The identifier may also identify an address (e.g., an IP address) for initiating the communication. At block 725, the processor initiates the communication between the user and the remote individual based on the identifier. The method 700 ends at block 730.

Shared AR Device

Figure 8B:
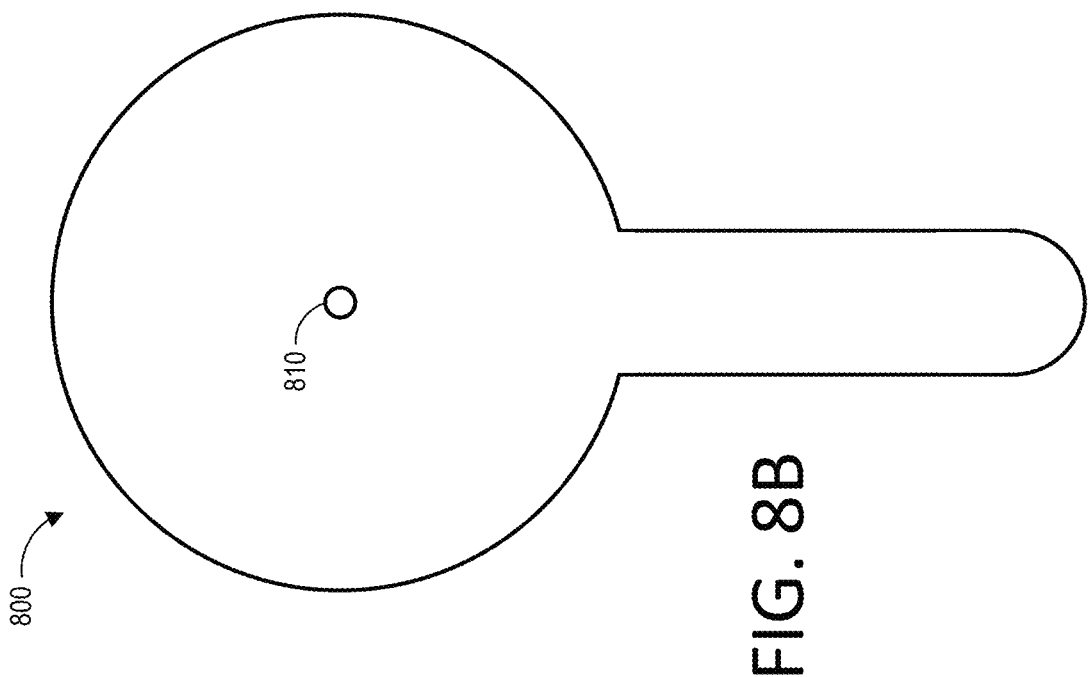
FIGS. 8A and 8B provide two views of an example shared augmented reality device.
Figure 8A:
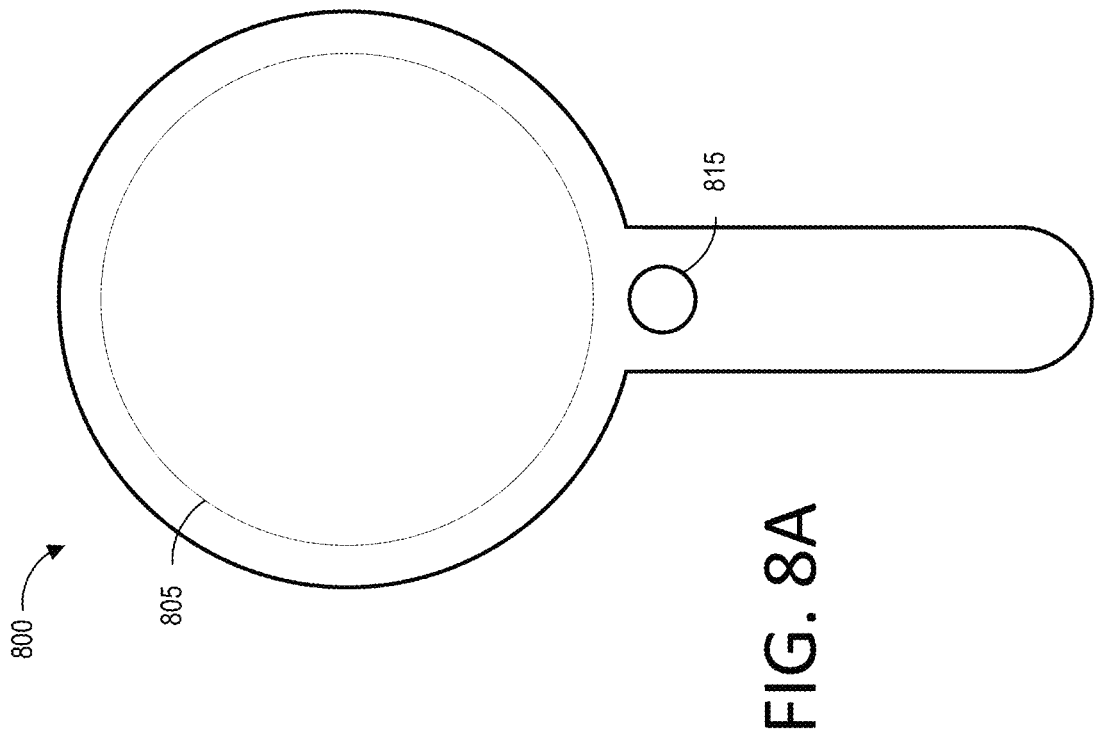

Aspects of this disclosure may be performed using a number of different electronic devices. One such electronic device that can be used by a local user for a shared augmented reality session is a shared augmented reality device that can be embodied in the form of a "virtual looking glass". FIGS. 8A and 8B provide two views of an example shared augmented reality device. Specifically, FIG. 8A illustrates a front view and FIG. 8B illustrates a rear view of the electronic device 800 of this embodiment.

Getting assistance from a remote individual may present certain challenges, especially for elderly persons, disabled persons, and/or children. Thus, there is a need for a device and a system that makes requesting assistance as easy as possible. The device 800 illustrated in FIGS. 8A and 8B has the form factor of a large looking glass. However, in place of the mirror in a looking glass, this embodiment of the electronic device 800 comprises a circular screen 805 and a back facing camera 810 mounted in the center of the back side of the screen. The device 800 may further include a processing unit (not illustrated), a communication unit (not illustrated) and an audio system (not illustrated) to enable the device 800 to perform aspects of this disclosure related to object initiated communication. For example, the device 800 may be configured to trigger a remote assistance session with a helper (e.g., a remote individual) that is preconfigured in a database. The remote helper may be able to see through the camera 810, provide instructions using his/her voice and draw augmented reality annotations that appear to stick to objects within the local user's environment when looking at the objects through the "virtual looking glass" 800. In one exemplary application, the local user may be an elderly individual who frequently has trouble with his/her medication. The device 800 may be able to recognize when the local user requires assistance with his/her medication (e.g., by recognizing the medication container) and can initiate a help session with an individual designated to assist the local user with the medication (e.g., a family member).

Remote help sessions can be run on an existing mobile devices (e.g., on smart phones and tablets). Unfortunately, the cameras of these devices are typically placed off center with respect to the main body of the device (sometimes even on a corner of the device). This placement of the camera can disturbs the "look through" experience of the device. For example, objects closer to the camera (such as a user's hand when interacting with an object in the environment) may not be displayed by the device's display in a position that directly corresponds to the user's hand since the camera is off-center. This can lead to situations where the user may experience disorientation (especially for elderly persons and/or children who may have a hard time determining how to point the camera at a certain area within the environment when they are close to a desired object). Another limitation of traditional electronic devices is that holding the device with one hand may be difficult especially for larger factor devices such as a tablet.

A remote communication help session may require at least two devices. The first device 800, used by a local user (e.g., the helpee), may have the form factor of a looking glass and may include a back facing camera 810 located approximately in the center of the looking glass, a circular screen 805 which may be configured to accept touch input, audio input and output devices (not illustrated), a processor unit (not illustrated), one or two buttons 815, a communication interface (not illustrated) configured to connect with another electronic device via a network (such as the Internet). Although the screen 805 is described an illustrated as being substantially circular, this disclosure is not so limited and the device 800 and/or the screen 805 may have a different shape such as a rectangular or square shape in other embodiments.

The device 800 may also be configured to access a database, which may be stored locally on a memory (not illustrated) or remotely in the cloud. The database can be configured to store object descriptions and associated identifiers (e.g., IP address) for initiating a remote help session with a remote individual.

The second device (not illustrated) can be used by a remote individual, who may be associated with at least one of the identifiers stored in the database. The second device may be embodied as, for example, a desktop computer, a mobile device (e.g., a mobile phone), a tablet, a head mounted display, etc. An exemplary embodiment of the second device is shown in FIG. 1 and discussed in detail above. The second device may further include a screen configured to accept touch input, a processing unit, a communication interface configured to be connected to the local user via the network, and audio input and output devices.

In one implementation, the local user can initiate a call to the remote individual. For example, when the local user requires help, the local user may press one of the buttons 815 of the device 800 and/or point the camera 810 of the device 800 at an object. The device 800 may then recognize the object and initiate communication with the remote individual via at least one of the object initiated communication methods described herein. For example, the device 800 may perform object recognition and retrieve an identifier from a preconfigured database. In another embodiment, the local user may say the name of the remote user to initiate the communication session. In this embodiment, a processor of the device 800 or a remote processor may perform voice recognition to identify the spoken name with the identifier for contacting the remote individual. This process may include matching the spoken name with a record stored in a database.

During a communication session between the local user and the remote individual, the remote individual is able to provide help by talking with the remote user over an audio link and by drawing annotations on objects within the environment captured by the camera 810. In addition to that the local user is able to hold the device 800 in one hand and reach into the environment while looking through the "virtual looking glass". In this way the remote individual is able to see what the local user is doing and provide assistance while the user is interacting with an object. For example, the remote user can provide instructions to the local user such as: "Turn the knob a bit further, yes, just that much. Now stop!" The specific design of the camera 810 (positioned at the center of the back side of the screen 805 and having a focal length that provides a natural "look through" feeling in an arm reach distance) makes the experience natural and easy to use even for elderly persons of children. The help session can be ended by pressing the button 815 on the handle of the device 800.

The specific form factor of the "virtual looking glass" device may have certain advantages over other form factors. For example, the device 800 may have an improved ease of use, allowing the local user to point the device 800 at an object, press a button, and/or say "Call . . . " in order to receive assistance immediately. The specific form factor allows the local user to hold the device 800 with one hand and use the other hand to reach into the view and interact with an object. The centrally positioned camera 810 generates a true "looking through feeling" and does not generate any confusion while reaching into the view. This may be especially important when getting help on manual tasks that need continuous feedback.

User Interface Sharing Between Multiple Local Devices

In a remote assistance scenario, the local user (e.g., the individual receiving assistance from a remote user) may have multiple tasks to perform. These tasks may include administrative tasks such as receiving his work order, reading documentation, calling for assistance, talking to a remote individual providing the assistance and receiving instructions while performing the manual repair work. While the use of a head mounted display (HMD) may be desirable for use when performing physical repair work (e.g., enabling the local user to go hands free for a given task), an HMD may not provide a convenient interface to wear all the time or to use while performing certain tasks, such as administrative tasks. For these tasks, a handheld mobile device may be more suited to the required tasks. Thus, aspects of this disclosure also relate to the use of a combination of a handheld device and a head worn device (such as an HMD) that enables the user to share a user interface (UI) across these devices, thereby streamlining the user experience.

Remote assistance systems may use a mobile phone or tablet to share the back-facing camera view of the local user with a remote individual. In certain embodiments, the remote individual is able to draw annotations directly on the camera view provided by the back-facing camera and share those annotations back to the local user. In these embodiments, the user experience may be acceptable as long as the user is doing the administrative tasks (e.g., receiving a work order, accepting the work order, reading documentation, calling for assistance, etc.). However, once the local user is connected to the remote individual in order to receive instructions while simultaneously performing manual tasks, the local user may be required to split time between performing the required tasks and interacting with the remote individual. This may require the local individual to put away the handheld electronic device while performing the manual tasks and to stop doing the manual tasks in order to interact with the electronic device for communication or other tasks which require the device.

In certain embodiments, a remote assistance system includes an HMD worn by the local user. In these embodiments, the local user experience may be improved during the remote communication session via, for example, freeing the user's hand for interacting with objects in the environment. The local user can thus use his/her hands to do the required manual tasks while receiving vocal instructions from the remote individual. The local user is also able to see what the remote individual is doing (e.g., adding annotations or other instructions) and is able to immediately respond to the feedback from the remote individual as soon as the remote individual receives the feedback. However, performing administrative tasks on an HMD may be tedious and inconvenient due to the restricted user interface associated with HMDs. For example, the lack of a physical keyboard and/or touch screen makes the input of text difficult when using an HMD.

Although aspects of this disclosure have been described in connection with a remote assistance setting, this disclosure is not limited thereto and may also relate to embodiments where the local user is not in communication with a remote individual. For example, the local user may be required to perform manual tasks while receiving information about the local environment. The tasks can relate to service and maintenance of an object/machinery, where the local user receives step-by-step instructions from a database.

Embodiments relating to sharing a user interface may be applied by a system that comprises at least two mobile devices (e.g., a HMD and a handheld device such as a mobile phone or tablet). The handheld device may include a processing unit, a communication interface that allows the device to communicate with a second device. In certain embodiments, the communication with the second device may include communicating with a remote individual over the Internet. The handheld device may further include a touch screen configured to receive touch input from the local user. The HMD may include a front facing camera, a processing unit, a communication interface, a display, an audio input device (e.g., a microphone) and an audio output device (e.g., speakers or earphones).

The camera of the HMD may be configured to capture images of the field of view of the user. The processing unit may be configured to perform tracking and in some cases 3D object recognition and tracking of the environment based on the images captured by the camera. The communication interface may be configured to communicate with the first device (e.g., via Wi-Fi, Bluetooth, etc.). The display may be a stereoscopic display configured to generate 3D image for the user. The display may also provide annotations which can be "anchored" to objects within the environment.

One application of the above-described system is a repair scenario. The user may perform repair of an object using both the handheld device and the HMD. For example, the user may use the handheld mobile device to run a specific application (e.g., a maintenance and repair application) on the handheld device. This application may allow the user to receive a work order (e.g., using the touch screen). The work order may be bundled with "AR experiences" (e.g., a set of computer-executable instructions which can be run on the HMD) for each repair sequence. For example, an AR experience may include tracking a target as well as providing predefined functionality to the user (e.g., step-by-step instructions may be provided to the user via the display and/or the audio output device).

The user may choose to read instructions and/or a manual of the object for repair using the touch screen of the handheld device. The user may then select and start a specific repair sequence using the touch screen. In response to this selection, the application run on the handheld device may send the associated "AR experience" to the second device (HMD). Thereafter, the user can put on the HMD and run the associated "AR experience". The HMD may include a specific application which can be run on the HMD and is configured to receive the "AR experience" from the handheld device for execution.

This application on the HMD can receive the specific AR experience and execute the same. Part of the "AR experience" may include the application running on the HMD starting the camera and an AR engine to detect and track objects within the local user's environment. The object tracked by the HMD may be defined within the received "AR experience". Once one of the target(s) is detected, the application may display certain content (e.g., annotations) over the target.

The application run on the HMD may also be configured to respond to certain voice commands received from the user. For example, the user may be able to say certain keywords, such as "next" or "repeat" in order to navigate the "AR experience". Alternatively, the user may be able to navigate the "AR experience" via gesture input detected using the camera of the HMD or via motion detection (e.g., the user may be able to move his/her head as input to the HMD). Accordingly, the local user can move through the "AR experience" while being hands free, enabling the user to perform manual tasks while simultaneously receiving instructions from the "AR experience" of the HMD.

Once the AR experience has completed execution, the application run on the HMD may signal back to the handheld device that the "AR experience" has been completed. Thereafter, the first application running on the handheld device is informed of the status of the "AR experience" and may then continue displaying information and receiving input for communicating with the local user.

In certain implementations, the second device (e.g., the HMD), is configured to function as a slave to a master application run on the handheld device. However, in other implementations, the HMD may be configured to run standalone software that communicates with the handheld device and can be run independent from the handheld device. In certain implementations, while the AR session is running, the handheld device may be configured to perform certain tasks, such as communicate with a backend system to fetch and receive additional data over a network (e.g., a cellular network, the Internet, etc.), provide computational services to the HMD to offload a portion of the processing from the HMD to the handheld device (e.g., performing object recognition on images received by an camera of the HMD) to balance the computational load between the HMD and the handheld device.

Another application is a remote assistance communication situation. In this embodiment, the user may interact with the handheld device to run an application (e.g., a remote assistance application) on the handheld device. This application may enable the user to perform one or more of the following actions: select a remote individual from a phone book stored on the handheld device or in the cloud, request a help session from the selected remote individual, and receive a call from the remote individual. Once a call with the remote individual has been initiated, the application running on the handheld device may send an "AR experience" to the HMD which is configured to run a remote assistance session with the remote individual.

The user may then put on the HMD, which may have an application running thereon so as to receive the "AR experience" from the handheld device and execute the "AR experience". The received "AR experience" may include: starting the camera on the HMD, starting an AR engine to track and reconstruct the environment based on image received from the camera, sharing the video and audio feed received by the HMD with the remote individual, and sharing a 3D reconstruction of the environment with the remote individual. The "AR experience" may further include receiving audio and annotations from the remote individual, and displaying the annotations and playing audio via the speakers of the HMD anchored to objects in the environment tracked by the HMD.

Once the AR experience has completed executing (e.g., the communication session with the remote individual has ended), the application running on the HMD may signal back to the handheld device that the "AR experience" has completed. Accordingly, the application running on the handheld device may be informed of the status of the "AR experience". The handheld device may then be configured to receive further input from the local user (e.g., to perform other administrative tasks).

Low Power Mode and Suspending Tracking During an AR Session

Vision based AR applications may consume a large portion of the available computing resources in order to track the device within the environment and to recognize new objects that come into sight. For example, it may be required for the AR application to know its position within the environment to correctly anchor annotations or other graphical elements to objects within the environment. However, there are situations where the local user temporarily puts away the electronic device in which the tracking and recognizing of objects is no longer necessary. For example, in a remote assistance communication application, the local user may follow certain instructions from a remote user and/or from a set of predefined instructions. In this case, the local user may be required to perform a manual task that required both of the user's hands, preventing the user from holding onto the electronic device.

Accordingly, if the electronic device is able to detect situations in which the user is not actively using the device for tracking and/or recognition of objects (e.g., viewing the environment through the electronic device), the computing resources, and thus battery power, of the electronic device can be conserved by turning these algorithms off. The electronic device may be able to detect these situations by analyzing the images received from the camera and an IMU to switch off camera input and computer vision tasks. The IMU input may be periodically checked to determine when the full computer vision algorithms are required to be reactivated (e.g., when the signals output from the IMU are indicative of the device being picked up by the user or moved around).

Many AR applications are vision based and thus use the camera of the electronic device for various computer vision algorithms such as device tracking (determining the position of the device within the environment), object detection and tracking (determining the position of known objects relative to the device), and/or 3D reconstruction (creating a digital 3D representation of the environment). All those algorithms require a relatively large amount of computing power compared to other algorithms run within the AR application. As discussed above, there may be situations in which a user does not require the computer vision algorithms to be run, e.g., when the user puts away the device to perform some other task.

In one implementation, in a remote assistance communication situation, the remote individual may provide instructions to the local user to perform a manual task. In this case, the local user may put away the device, perform the task with one or more of the user's hands and later pick up the device to show the results of the task to the remote expert. In another implementation, for example, when the AR application is providing step-by-step instructions, the user may be required to perform s manual task based on the instructions. When the user is not using an HMD, the local user may be required to put the device away and pick the electronic device back up after the task is performed.

While the device is put away, there may not be any relevant computer vision algorithms for the electronic device to perform. When the device is placed on a flat surface or in the user's pocket, there may not be any visual information on which to perform the computer vision algorithms. Thus, all the known objects which were previously being tracked may have disappeared from the view of the camera (e.g., since the camera is either pointing down onto the surface where the device is lying now or up seeing the sky or the ceiling). If the computer vision algorithms are not turned off in these cases, the electronic device may continuously attempt to locate known objects in the received images, thereby expending resources on computer vision tasks that are not beneficial.

Accordingly, in at least one embodiment, a combination of the images received from the camera and the signal received from the IMU are used to determine if the device has been put away or is not currently being used for AR. The electronic device may determine that the device is not currently being used in response to at least one of: i) the camera image being nearly completely black (e.g., the camera is covered) and the IMU indicating that the device is not experiencing changes in acceleration (e.g., changes to the signal are within a threshold of IMU noise and drift); ii) camera image does not change significantly from the previous image (e.g., the sum of absolute differences (SAD) between the two images is less than a threshold value) and the acceleration values from the IMU are within a threshold of zero (as discussed above).

In each of the above two situations, the electronic device may temporarily turn off the camera input and suspend all computer vision algorithms running in the AR application. However, the IMU signal may be periodically samples to determine when the computer vision algorithms should be restarted. Once the signal received from the IMU includes acceleration values that are larger than the above-discussed threshold, the camera may be restarted and the computer vision algorithms may also be restarted. In addition to automatically turning off tracking, either user can be given the ability to manually turn off tracking (e.g. a freeze button) and the display can then revert to previously captured key frames so that either user can browse through or manipulate a view into the previously captured environment while the camera is not capturing a scene of interest.

Virtual Navigation and Digital Visualization of a Remote Individual

Virtual Navigation may be performed in the context of interacting with a live streamed, augmented scene, and in particular, when a remote individual is assisting a local user of an electronic device. Virtual navigation may generally refer to decoupling of the remote user's (or the local user's) view from the live streamed video and locating the remote user within the tracked environment "virtually" by displaying a reconstruction of the remote user's position within the environment. As an example, for key frame-based virtual navigation, the remote user may enter virtual navigation by selecting one of the key frame views.

In certain remote assistance systems, a remote individual (e.g., a remote expert) is helping a local user using voice and video communication as well as drawn annotations. In situations where the environment the local user needs to operate is relatively large (e.g., the environment may be distributed over more than one room and/or simply very large machine) the remote user may be allowed to select his/her own viewpoint from a reconstructed version of the local user's 3D environment. In order to avoid confusion caused by the disconnect between what the local user sees and hears, the location of the remote individual may be visualized to provide the local user with the context of the a simulated location of the remote user. For example, the remote individual may be visualized in the form of an avatar comprising one or more of a head, hand(s) and voice, which may be rendered within the 3D environment of the user as augmentations to the environment.

In the situations where the environment in which the local worker is required to work is relatively large, it may be desirable for the remote individual to navigate the space of the environment independently of the local user to enable the remote individual to provide annotations to the portions of the environment in which the user is not currently located and/or to guide the user to a desired location within the environment. In one implementation, the remote individual is able to capture snapshots (e.g., images) from the screen during the session and annotate the captured snapshots. The localization of these annotations can be determined by the system based on the location of the objects within the snapshot to be anchored to objects in the local user's environment.

However, the ability of the remote user to annotate any given snapshot may create a disconnect between remote individual and the local user. That is, if the remote individual is not looking at the same part of the environment as the local user, the voice instructions given by the remote individual may not be related to what the local user is seeing. This may cause confusion to the local user, and may lead to errors due to miscommunication.

In order to solve this problem, the system may employ a 3D reconstruction technique that allows the local user to share a rough representation of the environment with the remote individual, thereby allowing the remote individual to navigate freely in the virtual representation and annotate anywhere within that environment. In one embodiment, the shared representation of the environment may include a 3D reconstruction of the environment as well as so-called key frames (also referred to as virtual navigation "anchors") including the pose of the camera that has taken those key frames. In certain implementations, a key frame may be a screen shot taken from the images captured by the local user's camera while the local user is navigating the environment. A key frame may also include information relating to the pose, e.g., the relative position and orientation of the camera in the environment when the image of the key frame was captured.

Certain actions by the local user may indicate that a particular area or perspective is of interest to him/her and/or is relevant for the task at hand. These actions may include: making an annotation, "pausing" a current action being performed by the user (e.g., looking at the "same" view for longer than a threshold period of time). These actions can be detected automatically. For detecting a pausing action, the system may be required to distinguish between a pause in which the user looks at an object/scene of interest from a pause in which the electronic device is put aside.

Since these actions may be indicative of the captured area and/or perspective as being of interest, the system may and add a virtual navigation anchor for those views (e.g., mark the associated image and/or perspective as a key frame).

The system's virtual navigation features may be supported by an environment tracking and modeling system (for example, a visual or visual-inertial Simultaneous Localization and Mapping (SLAM) system, a scene- or object-specific tracker, etc.). This system can provide a spatial frame of reference and understanding of the environment's spatial layout. Given this data as well as data about the local user's actions—e.g., where the local user looked and/or drew annotations—certain embodiments may automatically select a set of views (e.g., a combination of an image and corresponding perspective of the camera at the time the image was taken) that provide coverage of an object with which the local user is interacting. In some embodiments, the system may also weigh areas in which the local user has shown an interest in (e.g., as automatically identified above) more strongly than other areas when selecting the views. This weighting can be accomplished by a variety of different techniques, including multi-graph-cut algorithms, and others.

As described above, this freedom on the remote individual's side may cause confusion for the local user since the explanations and instructions via voice may be related to what the remote individual is seeing but not what the local user is seeing. The confusion may be related to the fact that the local user is not aware of the portion of the environment that the remote individual is viewing. For example, if the remote individual was in the same room as the local user, the local user would be able to hear the voice of the remote individual as coming from a specific direction and would also be able to look in the specific direction and see what the remote individual is looking at.

One aspect of this disclosure addresses this problem by introducing a digital representation of the remote individual and displaying this representation in the local user's environment. The representation (e.g., an avatar) may include a representation of a head and/or a hand of the remote individual. In certain implementations, the head and hands may be displayed as semi-transparent to prevent obstructing relevant parts of the environment from the local user. Additionally, a location of the voice of the remote individual can be simulated using 3D sound to signal to the local user the position of the remote individual.

In certain embodiments, a representation of the remote individual's hand may be displayed only when the remote individual is drawing an annotation. Similarly, the head of the avatar may only be displayed when the remote individual has navigated to a different point of view than that of the local user.

In one embodiment, the position and orientation of the avatar's head and/or hand(s) can be determined using the following technique. When the remote individual selects a view that is different from the view of the local user, the remote individual may be virtually navigating the digital representation of the environment received from the electronic device. There may be two different ways for the remote individual to navigate the environment: i) the remote individual may select one of the captured key frames directly and ii) the remote individual may select a position that is on a transition between two or three key frames. Limiting the navigation of the remote individual to these two options may have the two advantages: i) this technique provides a simple method for the remote individual to navigate the environment and ii) the pose of the virtual camera rendering the view for the remote expert may be determined by interpolation of the poses of the camera in capturing the used key frames.

When the local user is navigating the environment using the electronic device (e.g., in order to see all the annotations in the environment), the pose of his/her electronic device relative to the environment can be determined. Similarly, the pose of the remote individual can be determined based on the navigation of the remote individual as discussed above. From the poses of both parties, the camera position and orientation of the remote individual relative to the local user can be determined and rendered. In a similar way, the voice of the remote individual can be rendered using the same relative positioning, so that the local user is able to see and hear the remote individual through the avatar representation of the remote individual in the environment.

Whenever the remote individual is drawing an annotation, a hand holding a pencil may be displayed to indicate to the local user both the position of the remote individual and the fact that the remote individual is adding a new annotation. To place an annotation, the remote individual may select one or more of the key frames as discussed above. The remote individual may then draw a sketch using either a mouse or a touch interface or any other 2D input device. In this way, the remote individual can specify a sequence of 2D locations (describing lines or points) on the screen. Based on the 2D pose of the current input, the 3D pose of the key frame selected by the remote individual and the local user's pose in the environment, the pose (e.g., the position and orientation) of the remote individual's hand can be determined relative to the local user's viewing position, thereby enabling the electronic device to render the hand accordingly.

As described above, the remote user may enter virtual navigation by selecting one of the key frame views. However, in certain embodiments, virtual navigation may also be entered automatically by the system. This may be performed based on the system state (e.g., whether a remote assistance session is active, whether there is a live stream of video, etc.), environment signals (e.g., the location of the local user, etc.), and context (e.g., the actions previously performed by the remote user, etc.).

In certain situations, the live video stream may not provide useful information to the remote and/or local users. For example, when the local user puts the electronic device down (or places the device in his/her pocket)—for example, to perform a task with two hands, or to perform another, parallel task in the meantime. The system may be able to detect this state automatically, for example, based on signals such as: (lack of) electronic device movement (inferred to via inertial and/or visual measurements), electronic device orientation (inferred to via inertial and/or visual measurements), and the camera image. If the state of electronic device has been determined to be put down, the system may automatically send the remote user into virtual navigation. Putting the remote user into virtual navigation may include selecting an appropriate alternative view (e.g., key frame view), for example an overview view and/or the last view used by the remote user.

In certain embodiments, automatically initiating virtual navigation can be applied not only to the remote user(s), but also to the local user. For example, as the local user puts down the electronic device, the local user can be presented with the same view selected by the remote user and/or the last view that the remote user drew annotations on.

Shared AR Session Recording and Playback

Augmented reality or virtual reality (VR) systems described herein may be configured to record images, video, and/or annotations for concurrent communication to a remote system for display or for subsequent access and viewing by the remote system. In some embodiments, the AR or VR system can be programmed to communicate concurrently while also creating a recording for later review. Accordingly, in some embodiments, an AR or VR session may be generated based on a "live" or current issue being faced by the user and recorded for later review by the user or other users or recorded for later review by the users and other users.

In some embodiments, an offline AR or VR instruction session may be automatically recorded from an online session between the user and, for example, a remote expert. Accordingly, both the remote expert and the user may be using devices that support AR or VR. Furthermore, at least one of the remote expert's and the user's device (or an external device or system) may be further configured to record the AR or VR session. Either device may also replay the recorded session. Accordingly, AR or VR may provide instructions in an offline mode.

In some embodiments, the user's device may correspond to the computing device of FIG. 2 or the local user interface of FIG. 1. The user's device may allow the user to communicate with the expert user and get help using AR or VR. The communication between the user and the expert user may consist of an audio communication (unidirectional or bidirectional), a video communication from the user to the expert user (allowing the expert user to see, in real time, the same environment as the user), and a data communication (via which content overlaid over the video communication, such as annotations, may be displayed for both the expert user and the user).

In some embodiments, the user and the expert device may include one or more components for tracking the respective device in its environment and localizing the respective device within its environment. Accordingly, either device may perform simultaneous localization and mapping of itself to track a perspective or location of the device in relation to one or more critical anchor points. The processing unit 202 or other component of either device may further include a sparse environment reconstruction method that allows the devices to share a "rough" or "coarse" 3D representation of the user's environment with the other user. Additionally, or alternatively, the devices may include one or more components that allow the users to provide or exchange instructions and/or comments in several ways. For example, the expert's device may include audio inputs allowing the expert to provide verbal instructions and or annotations. In some embodiments, verbal annotations may include any verbal statements or instructions provided by the expert. In some embodiments, the expert's device may include visual inputs that allow the expert to draw or type annotations into the video feed being received from the user. The processing unit 202 and/or the component for tracking and localizing of the expert device may localize the visual annotations within the environment of the video feed using the 3D reconstruction. Assuming the user is viewing the expert's video in real time, the expert's annotations would, accordingly, be communicated to the user in real-time as they are drawn by the expert and will appear to the user to "stick" within the user's environment. Sticking within the user's environment means that the annotations may remain positioned at their original location in the user's environment regardless of the position of the user's device in the user's environment. Accordingly, the expert's annotations may be augmented or added to the environment as viewed by the user while allowing the user to freely choose his/her viewpoint to look at the user's environment as well as the annotations. By allowing the expert to include both verbal and visual annotations, the expert may provide the user with all necessary instructions for a very specific repair. As the AR session may be recorded, the expert's annotations may be provided for use by various users, and the "sticking" annotations can then be used to overlay or annotate or overlay over different video captured by the devices of those various users. Further, this may allow the various users to be at any perspective or position in their respective environments without losing the effect or message of the expert's annotations.

The AR and VR sessions (e.g., the video feed from the user along with the annotations by the expert and the localization information for the expert's annotations) may be captured and/or stored in a very specific form as help sessions for distribution to those having similar problems in similar environments. In some embodiments, these help sessions may be stored on a server or device and allow users to access the help sessions as needed for replay at future times (e.g., "on demand"). Since the help session was an AR or VR session and not merely a video, the user may replay the sound, video, and annotations in the user's 3D environment. Therefore, independent of the viewing position of the user viewing the help session in the environment, the annotations, sounds, and video provided by the expert are displayed at the right position in the environment and will follow the same sequence and timing as when recorded.

When help sessions are recorded and stored, each stored help session may include a 3D reconstruction of the environment. In some embodiments, each 3D reconstruction of the environment may include one or more significant feature points that allow the user viewing or replaying the help session to identify and/or recognize the environment and track the environment and any movements or annotations within the environment. Accordingly, a user viewing or replaying any help session may use their device to recognize the environment and track the 3D location and timing of any expert annotation that has been drawn along with the voices of both the expert user and any other participants, including the spatial location of any user or expert device relative to the environment (e.g., the spatial location of recording position of the user device and the spatial location of the viewing position of the expert device). Given the 3D reconstruction of the environment and the spatial locations of the original user and the expert, the user that is viewing or replaying the help session may view or replay the help session in any environment that is similar to the original user's environment or that at least includes the one or more significant feature points (e.g., a front of a vehicle being worked on, etc.).

In some embodiments, recorded sessions can be used in conjunction with object recognition and/or SLAM to overlay recorded annotations over video captured from a new environment. Thus, many users in varying environments but dealing with similar issues with the same or similar object may be able to utilize the pre-recorded or stored help session without being in exactly the same environment and dealing with exactly the same object. As such, the user(s) needing assistance may obtain the needed assistance without relying on the expert to be available at that exact moment, instead accessing the stored help session (e.g., in a help session database accessible by either of the user devices or any device).

By recording and saving the 3D representations, the help sessions may be viewed or replayed in various ways using various devices and technologies and environments with different captured video. For example, a recorded or saved help session (either VR or AR) may be replayed on the same object in the same environment. For example, another user with access to the original object and environment and the original user device may replay a recorded or stored help session to review and/or understand what actions were performed on the object. In this case, the one or more significant feature points of the environment may be used to recognize and track from the previously recorded actions and/or annotations (verbal and visual) with proper positioning in the 3D environment.

In another or the same embodiment, the same or another user may replay the recorded or stored help session (either VR or AR) on a similar looking, but different object in either the same or a different environment. For example, if the user or other user is a mechanic at an automotive repair shop, the environment may always be the same but repairs may be on similar vehicles. As noted herein, the stored feature points may be used to "anchor" the help session content to the object and allow the reuse of the help sessions on objects and/or environments.

In another or the same embodiment, the recorded or stored help session (e.g., an AR help session) may be replayed in a virtual environment. For example, since a 3D representation of the environment (including significant feature points) of the help session is stored as part of the help session, another user may be able to view or replay the help session in VR application or environment. For example, the VR application or environment may be able to recreate the environment in a virtual manner based on the stored 3D representation. Furthermore, as discussed herein, the user may be able to track movements, objects, annotations, etc., based on the stored significant feature points. Accordingly, the user viewing or replaying the help session may be immersed into the reconstructed environment and may experience the annotations (verbal and visual) and witness the issue and solution without having access to the real physical environment. In some embodiments, the recorded or stored help session may be used for training purposes.

In some embodiments, the help session may be viewed or replayed on a non-VR or non-AR computer or device by rendering the 3D representation of the environment directly on the screen. Accordingly, the stored significant feature points may be displayed using the screen of the computer or device in proper relation to the environment and object shown on the screen and the visual annotations may be displayed on the screen in conjunction with the displayed environment and object. Additionally, audio components of the computer or device may replay the verbal annotations stored as part of the help session. The user viewing or replaying the help session may be able to navigate the environment freely, which may be useful in educational and/or training environments. In some embodiments, the viewed or replayed help session may be reviewed without navigation capabilities and may instead may reviewed or replayed from the perspective of either the original user or the expert.

In some embodiments, a recorded help session may include long periods of time where nothing relevant to the object or the environment occurs or when no useful annotations (verbal or visual) are provided. Accordingly, these long periods of time may be automatically detected and deleted from the help session before the help session is played back. In some embodiments, these periods may simply be skipped over or fast-forwarded through.

In some embodiments, one or more subsequent users may be able to add annotations to the stored help session. For example, a supervisor may review an employee's repair, etc., and provide comments or the work performed or provide suggestions and/or feedback. In some embodiments, the system storing the help session may detect indicators provided by one of the user or the expert that indicate when critical or important periods of the help session begin and/or end, and these indicators may be used to automatically detect and delete periods that are not useful. In some embodiments, simple mechanisms may be used to identify and remove sections of the recording that don't contain any information. For example, periods of no verbal and/or visual annotations may be detected and deleted. In some embodiments, the periods may be detected and/or deleted based on a specified minimum length threshold (e.g., where the detected and/or deleted period must be greater than a minimum length). In some embodiments, the detected periods may not be deleted but rather skipped over during playback. Accordingly, a compact representation of the help session can be generated and/or replayed.

In some embodiments, each person (e.g., user, expert, other user) that adds or provides information for the help session may add a new layer to the help session. For example, the original recording of the environment and/or object provided by the user may comprise a single layer or portion in the help session. The expert's verbal and/or visual annotations may comprise a second layer or portion in the help session. A later other user may provide feedback and/or additional comments as a third layer or portion of the help session. In some embodiments, the other user (or the expert or user) may include another help session as part of the help session. Accordingly, help sessions may be embedded in other help sessions during recording and storage. In this way, multiple versions of help sessions with multiple layers of information will be generated and stored for later retrieval and use to support future help sessions or an offline use as described.

Offline use may comprise viewing and/or replay of the help session by a user that is not connected or in communication with the expert at the time that the help session is reviewed. Alternatively, or additionally, the offline use may comprise the viewing or replay of the help session when not connected to a communication medium. In some embodiments, the expert or another user may use a tool (e.g., an offline or online editing tool) to edit stored help sessions, for example generating step-by-step instruction from the help sessions. Additionally, one or more users (e.g., the original user, the expert user, or other users) may use a tool that allows for selection of short sequences from a complete help session and defining of the selected short sequences as single steps in a step-by-step instruction. Such step-by-step instructions can then be replayed in any AR or VR capable device.

Recording instruction sessions using video is well known and widely used. However, since every environment might look slightly differently, especially from different viewpoints, such instructions might cause more confusion than they would help. With our innovation the instructions are played back in any similar environment directly on top of the environment and allow the user to be consumed by choosing a free viewing angle. This is especially important when the user is wearing a head mounted display to be able to use his/her hands to follow the instructions. It is also important in situation where the user is not able to look from the same viewing angle as the recording was done (maybe because there is some other object(s) in his environment that blocks him/her form going there).

Examples of advantages of being able to record and replay VR and AR help sessions may include that such help sessions may be used to automatically generate instructions (e.g., step-by-step instructions) based on the stored help session. Additionally, when the stored help sessions include the tracking information for the recording user and the various objects, the help session and/or instructions can be replayed in similar environments where similar tracking information or points can be identified in the replay environment. Accordingly, the help session or instructions can be replayed while freely choosing the point of view of the user. In some implementations, the help session or the instructions can be compacted so that they can be stored, communicated, and replayed in a compressed format.

In some embodiments, the user may initiate the AR or VR session by capturing a video of the object in the user's environment using the user device (e.g., camera). The video may be shared with the expert, who may add and save annotations to one or more objects in the video. Each annotation may be saved with reference to a spatial relationship to the object and a temporal relationship to a time within the session. These annotations may be stored with the session so that the user or any other user may review the session and see the annotations in relation to the object in question.

In some embodiments, the expert may initiate a second augmented reality session, capturing an object in his/her environment and superimposing a new session and/or objects on the saved annotations, wherein the each annotation is superimposed in spatial relationship to the second object based on the saved spatial relationship and in temporal relationship to a time within the second augmented reality session based on the saved temporal relationship. For example, this may allow the expert to create a session that the user can replay in a local environment without first sending the environment to the expert.

In one embodiment, a method can include: initiating a first augmented reality session where a first camera captures video of a first object within the camera's field of view; saving augmented reality annotations created during the first augmented realty session, where each annotation is saved: in spatial relationship to the first object, and in temporal relationship to a time within the first augmented reality session; initiating a second augmented reality session where a second camera captures video of a second object with the camera's field of view; and superimposing the saved augmented reality annotations over the video captured by the second camera during the second augmented reality session, wherein the each annotation is superimposed: in spatial relationship to the second object based on the saved spatial relationship, and in temporal relationship to a time within the second augmented reality session based on the saved temporal relationship.

Shared AR Session Bandwidth Adjustment

Some remote assistant systems employ audio/video (A/V) feeds or conferencing techniques to allow the expert to see the user's environment and conditions and provide help accordingly. In some embodiments, an audio medium or channel may provide bidirectional voice communications and a video medium or channel may provide bidirectional video communications. Such systems may utilize large data transfers to communicate the A/V information. Such large data transfers may necessitate high bandwidth and/or speed connections between the expert and user. In general, the transfer of A/V data utilize high bandwidth communications to ensure complete transfer of actions, comments, etc., in real time or with minimal delay, allowing all viewers or recipients of data to receive the conveyed recorded or live data in a useful manner. Accordingly, such systems may have reduced functionality in environments where communication coverage is reduced, such as power plants, mines, cellars, equipment rooms, industrial facilities, etc. In A/V conference systems, the quality of the A/V feed or conference may be reduced or the video may be turned off completely. In situations where the video feed was relied upon for conveying important information, the reduction to only video may result in communication errors and subsequently higher error rates by the user. For example, when A/V data is generally transmitted in low bandwidth conditions, the A/V data may be received by a viewer in short bursts or with larger periods of buffering as compared with high bandwidth conditions. These shorts bursts or increased buffering periods may increase frustration or make it difficult to follow what is being shown or conveyed in the A/V data feed.

In some embodiments, when there is no high bandwidth communication available, the A/V feeds or conference techniques may revert to audio transmissions alone. In reverting to audio transmissions alone, much longer communication times may be needed to relay the necessary information between the user and the expert and subsequent increases in miscommunication and errors are seen.

However, in AR and VR systems, high speed and high bandwidth connections may not be required for the duration of the communication. For example, once the initial environment is communicated as a 3D digital representation, information such as verbal or visual annotations may be provided at much lower bandwidths. Accordingly, AR and VR systems may share the 3D representation over a high bandwidth connection and maintain visual and verbal annotations communication should the connection between the user and the expert degrade to levels where video/audio conference systems would be forced to drop to audio only connections.

In some embodiments, the AR or VR system of FIG. 1 may determine that the communications between the user and the expert have degraded or are insufficient to support both video and audio communications. In some embodiments, the determination of the sufficiency of the communications may be made by at least one of the processing unit 202 or the communication connection 220. If the determination is made that the communications link still exists but conditions have degraded below a specified threshold, the AR or VR system may determine that no video will be shared while voice and data are shared.

In some embodiments, this determination may be made before or after the initial 3D representation of the user's environment is conveyed from the user device to the expert device. Accordingly, the AR or VR system may reduce communications exchanged between the devices to audio and data only. Since the expert device already has the 3D representation of the user's environment, only minimal information needs to be conveyed from the user to the expert. This minimal information may include data regarding 3D representations of particular objects, etc., that the user is actively viewing or manipulating. The 3D representation of the object may be communicated as data and may be reconstructed by the expert device the AR or VR environment. The 3D representation of the object may be conveyed as data using less bandwidth than video information of the same object. Accordingly, by conveying the 3D representation of the object, movements, annotations, or other details of the object may be conveyed even in low bandwidth or speed conditions.

In operation, after detecting a low bandwidth or speed condition, the user device and the expert device need not share video, but only voice and some data. While the user is viewing his/her environment, the user device generates the 3D reconstruction of the environment and object(s) being viewed and shares that 3D reconstruction with the expert. The expert device receives the 3D reconstruction of the user's environment and generates a virtual or augmented display of the user's environment. The expert may use the virtual or augmented view of the user's environment generated based on the 3D reconstruction and may provide verbal or visual annotations. The expert device may convey the visual annotations as 3D reconstructions to the user device along with any verbal annotations from the expert. The user device may receive the verbal and visual annotations from the expert device and provide the visual annotations in the proper location in the environment and play the verbal annotations from the expert.

By reducing the communications between the user device and expert device to the 3D representations instead of video, the AR or VR system is able to reduce the data that needs to be communicated between the devices. Since a video stream contains a lot of redundant information (e.g., information regarding objects, etc., that do not change between frames of the video), and the 3D representations do not, the communications between the user and the expert are "compressed".

In some embodiments, the user device of FIG. 2 may have no connectivity to the expert device in the environment of the object at issue for the user. Accordingly, there may not be any video, audio, or data communication for the user device. In embodiments where no connectivity existed, no information regarding the user's environment was provided to the expert. In such an instance, the user may scan his/her environment with the user device and create a 3D reconstruction of the environment plus a tracking map. In some embodiments, the tracking map may provide the significant feature points according to or relative to which movements, annotations, and other actions may be tracked. Once the user device creates the 3D reconstruction information, the user may move to a location where communication is possible and the generated 3D reconstruction information and the tracking map is communicated to the expert. The expert may receive the 3D representation and tracking map and may provide verbal and/or visual annotations. These verbal and/or visual annotations may be communicated as video, audio, and/or data. For example, as described herein, the verbal and/or visual annotations may be communicated as 3D representations. Once the user receives the annotations from the expert, the user may move back to the original environment without communication and replays or views the annotations from the expert via the user device in AR or VR. Thus, the user may obtain the assistance needed regardless of the communication capabilities in the environment where assistance is needed.

In such embodiments, the request for assistance may be split into two parts. The first part allows the user to submit information to the expert and receive the expert's instructions and comments and the second part allows the user to replay the expert's instructions and comments to guide him/her through the issue. Since only the first part needs a connection between the user and the expert and could be performed with a pre-captured model of the user's environment, this two part technique may help provide a solution in situations where there is no connectivity at all at the actual environment.

Associating Annotations with Recognized Objects

When using augmented reality or virtual reality in an environment accessible to or by multiple users, sometimes one or more of the users may annotate an object in the environment so that others are able to see the annotation. One common annotation may be a rough outline drawn around the object to highlight or indicate that the object is selected or identified by the user creating the annotation. However, such an outline may be dependent on various factors, including a viewing direction from which the outline was drawn, a viewing direction from which the outline is viewed, a shape of the object being outlined, an amount of the object that is exposed to view, among others. While the outline as drawn by the user might perfectly fit the object from the drawing direction, the outline might not even be close to the object's outline when viewed from another angle.

For example, in many VR or AR systems, the user device may include a flat or two-dimensional touchscreen. Accordingly, use the touchscreen to display an augmented view of the object or environment and may draw or directly interact with the object or environment to insert visual annotations directly onto the augmented view. While viewing the object or environment via the user device, the object or environment may be 2-dimensional, and accordingly, any added visual annotations may also be 2-dimensional and based on the 2-dimensional view of the object. Thus, even if the 2-dimensional annotation is perfectly displayed in relation to the object (e.g., a perfect outline of the 2-dimensional view of the object), the 2-dimensional annotation may be improperly shown or perceived from other viewing directions. This deficiency may be further complicated when the object has a complex shape.

In some embodiments, when the object is viewed and annotated by the user device, the user device may generate a 3D model or reconstruction of the object. This 3D model or reconstruction may utilize information from a depth sensor to identify the 3D shape data of the object and, thus, render the 3D model or reconstruction. However, such use of a depth sensor may require additional hardware in the user device, which may not be desirable.

Alternatively, or additionally, 3D object recognition and automatic outline generation may help ensure that the outline drawn by the user is properly shown and/or tracked regardless of the perspective of other users viewing the object. Accordingly, the other users may view the object as it was originally selected or identified by the user regardless of the other user's perspective of the object. The 3D object recognition and automatic outline generation may allow for the varying of viewing viewpoints independent of the creation viewpoint regardless of when the annotations are created and viewed. Additionally, the 3D object recognition and automatic outline generation may allow for the varying of viewing viewpoints independent of the creation viewpoint regardless of whether the annotations are created and viewed in the same environment with the same or similar object or in different environments with the same or similar object.

While the example annotation described herein relates to outlines of objects, the same issues of properly tracking and/or indicating annotations in relation to or corresponding to a target object from various perspectives different from the original user may exist for any visual annotation.

When the user adds an annotation indicating or identifying an object via the touchscreen of the user device (e.g., in AR), the user may draw a rough outline around the object or may draw an arrow pointing to the object. When the indication (either outline or arrow) is rough or not very specific, the user device may automatically identify which object is being indicated. For example, if the circle drawn by the user surrounds approximately 80% of the object and 20% of another object, the user device may determine that the user intends to identify the object (e.g., based on a comparison of what is included in the drawn circle). Similarly, when the user draws an arrow, the user device may determine the object that is mostly likely being identified by the drawn arrow. In some embodiments, since the user indicates an area where the object exists when the circle or arrow is drawn, the user device may use that area to identify a region in which object recognition is performed (e.g., via an object recognition algorithm). By focusing the object recognition only on or near the area indicated by the user, efficiency of the object detection may be improved.

The object recognition algorithm may utilize a database of all objects in the environment that users might annotate. The database may include 3D geometry of each of the objects as well as various parameters of the object (e.g., name, label, previous annotations, etc.). Once the object recognition algorithm identifies the object from the database, the user device may determine a pose of the object (e.g., a 6DoF pose including (x,y,z) coordinates of position and (x,y,z) coordinates of orientation, such as an indication of three (3) rotations around a main axis of the object relative to a reference coordinate frame). Accordingly, the user device may create the outline or arrow identifying the object as it is seen from this specific point of view.

When the annotation is communicated from the user to another user, the annotation may include information about the annotation (e.g., 3D object tracking information and the annotation identifier) and/or information about the object annotated. For example, the annotation information may include information relating the annotation to a tracking or reference point in the environment to track or localize the object and/or annotation. The annotation information may also identify the type of annotation (e.g., outline, arrow, etc.). By tracking the object being annotated, the annotation can be located appropriately in relation to the object regardless of the viewpoint of the other user viewing the annotation. Accordingly, regardless of the pose of the object in the view of the other user, the annotation may appropriately identify the object (e.g., the arrow will be pointed at the right object or the outline will be applied to the current viewed pose of the object). For example, the outline of the object created by the user may be aligned with the object as viewed by another user by identifying the pose of the object as viewed by the other user. The identified pose may then be used in rendering the outline based on the geometric representation of the object as stored in the database.

In some embodiments, 3D object tracking may update a new pose for each frame of the annotation and/or object. This new pose allows for rendering the outline of the object from the geometric representation of the object. The object recognition as described herein may be performed using various methods, for example feature based methods, template matching, or recognizing objects using a trained neural network. Additionally, or alternatively, object tracking can be performed using various techniques, including, but not limited to, feature tracking, edge tracking, tracking by detection (meaning the detection methods described herein are used for every frame).

In another version, the user creating the annotation just touches the object that is displayed on the screen. The input from the user's touch is used to perform automated object recognition using machine based recognition based on a database of objects to be recognized. Additionally, the database of objects may include computer aided drafting ("CAD") representations for the objects in a hierarchical structure of assemblies, sub-assemblies, parts and subparts. Accordingly, the user device may utilize the CAD representations of the hierarchical structure to draw an outline around or select the object. For example, the user device may draw an outline around or select the smallest identified part under or near the user's finger. As the user continues to maintain the touch (e.g., keeping the finger contacting the touchscreen), the user device may expand the outline or selection to now select the next higher assembly in the product hierarchy. This expansion of the outline may continue until the user discontinues the touch (meaning the user is satisfied with the object outline or selection). In some embodiments, the user might move a finger around on the touchscreen and each part of the assembly or environment being touched may be included in the selection and the outline may be drawn around all of the selected parts.

Alternatively, or additionally, the CAD model of the object as stored in the database of object may be used to highlight selectable features of the object as detected in the AR field of view. In some embodiments, the selectable features or parts can be internal to the object (based on the CAD model) and might not necessarily be visible in the camera's actual field of view. Accordingly, such features or parts may be displayed in a "window" or other frame of the object that indicates that they are internal to the object. The user may then point and/or click to select various highlighted parts (visible or obscured) of the object. Additional functionality or features can then be presented to the user based on the selected part. Accordingly, the user may be able to select a portion or part of an identified object and keep that portion or part highlighted. The CAD model could then be continually referenced to update the perspective of the highlighting of the selected part consistent with the camera angle/perspective.

Additional techniques and methods that can be used in various embodiments for selecting parts of recognized objects for annotation are described in Appendix 3 "DISPLAYING CONTENT IN AN AUGMENTED REALITY SYSTEM" of priority U.S. Provisional Application No. 62/512,696, referenced above. For example, a CAD model of an object can be used to highlight selectable features of the object in the AR field of view. The selectable features or parts can be internal to the object (based on the CAD model) and might not necessarily be visible in the camera's actual field of view. The user can then point and/or click to select various highlighted parts (visible or obscured) of the object. Additional functionality or features can then be presented to the user based on the selected part. The part selection functionality can be used to present the user the ability to select a portion or part of an identified object and keep that part highlighted. Further, the selected part might be one that is obscured or not visible within the camera's field of view. The CAD model can then be continually referenced to update the perspective of the highlighting of the selected part consistent with the camera angle/perspective.

In some embodiments, the object identification or recognition algorithm described above and implemented by the processing unit may be configured to identify the object, and the processing unit may further identify details regarding the identified object in a database. For example, the processing unit, after identifying an object as being a sink faucet, may access a CAD file of the sink faucet and use the CAD file to identify hidden components (e.g., components that are not readily visible) of the sink faucet. In some embodiments, this may be shown as a semi-transparent or transparent overlay view or layer. This overlay view may show all or some selectable parts. In some embodiments, the overlay view or the CAD file may include a menu or list of parts, where selection of an item in the menu or list by the user will highlight the part in the overlay view. In some embodiments, there may not be an overlay view and the parts will be selectable or highlighted on the main view itself.

Accordingly, as described herein, annotation may be created using prior knowledge on the environment (e.g., stored in the database). This prior knowledge may be used to augment the annotations to better identify objects and draw the annotations in proper relation to the object independent of the viewing direction. This allows the viewing user to be positioned at any position or location around the object and still see the object annotation. This may be an improvement over systems where the annotation sticks to the position where it was placed and therefore is hardly visible from other viewing direction or does not change shape according to the perspective changes of the object. In some embodiments, the database of objects may be utilized in conjunction with a depth sensor.

Automatic or Assisted Management of Annotations

Augmented reality (AR), mixed reality, and virtual reality technologies may facilitate communication between participating users. For example, one user may annotate a specific object or object part in a scene shared between the users to convey a message regarding the object or object part. One or more of the users may wish to label one or more of the objects or object parts so that the other users are able to visually see the name of the object or object part in addition to hearing the name. However, as discussed herein, placing a label on an object in the 3D environment may be complicated, requiring identification of the object, locating of the object in 3D, and annotation of the object with label text. Placing the label on the object may be further complicated when the environment of the object is not pre-known and when the users are using mobile devices (e.g., head mounted displays) where text typing is difficult and/or tedious.

In some embodiments, simultaneous localization and mapping (SLAM) may be used to generate 3D representations of the objects and annotations and track the target object and annotations. In some embodiments, the user may draw abstract circles/outlines and provide verbal comments, such as "do something to this object" while identifying an approximate location or drawing a rough shape of the object. The verbal comments may include nouns and verbs, and the AR system (e.g., the user device or another component of the AR or VR system) may use the nouns to identify and label the object drawn by the user. In some embodiments, the system may identify an anchor point based on the object that is drawn by the user. In some embodiments, the system may automatically generate labels for annotations of objects. In some embodiments, the system may automatically update annotations based on verbal comments of the user or users. In some embodiments, the verbs of the verbal comments may be indicated with icons or animations. For example, the verbal statement "open this panel" may result in the panel object being automatically identified when generally circled or indicated by the user and a button or animation for "opening" may be displayed in relation to the identified panel object. In some embodiments, the various actions to be performed may be presented in a particular sequence or may be displayed in a delayed fashion as actions are completed. In some embodiments, a combination of SLAM with user annotations and/or other input may be used to track a position of the object in the AR/VR world.

In some embodiments, annotations and icons generated based on verbal comments may be conveyed to a deep learning system, which may supplement the creation of the annotation labels (e.g., if the user's annotation is not enough, deep learning based on the instructions may identify the proper target object). Additionally, or alternatively, deep learning may be used predictively to assist with generating labels and/or annotations based on the objects in the view and the verbal commands/statements to simply user interaction in generating the annotations. For example, if the user is typing annotations, deep learning may provide words of objects/commands associated with a particular view.

In some embodiments, annotations and/or labels may automatically be removed as actions are completed or objects addressed. For example, if annotations or instructions involve removing a screw, the annotation area may be examined by the system to determine if a screw exists in the view that needs to be removed. If not, then the annotation/label/actions may be removed. If so, then the annotation/label/actions may remain until the screw is removed. Accordingly, deep learning may be used to more easily create labels and also to remove labels as actions are completed or the objects disappear. Accordingly, the system may continue monitoring the annotation area to determine when to remove labels and proceed to subsequent steps. In some embodiments, the user performing the actions or instructions may indicate completion of each action or command, which may reduce computation cost by reducing scanning of the annotation area.

Furthermore, in some embodiments, the system may determine to pause video, transmissions, recording, deep learning, etc., while no sound or annotation is being added to the environment. Such automatic pausing may save or reduce processing by the system. Alternatively, or additionally, the system may await a command or "okay" from the user.

In some embodiments, the AR or VR system may include a device for each user (e.g., a mobile device like a tablet or mobile phone, a head worn device like Google Glass or any other head mounted device, desktop PC, or laptop). The user device may comprise a camera that allows the user to capture a stream of images from the user's environment and a processing unit that analyzes images captured by the camera and determines relative position of the device within the environment (e.g., performs device tracking). The user device also comprises a processing unit (might be the same processing unit described above) that reconstructs a rough digital model from the images captured by the camera and the associated poses of the object (e.g., creates a 3D reconstruction). The user device further comprises an audio input/output component to communicate with the other users. The user device also comprises a touchscreen to be able to view and interact with (e.g., draw or sketch over) the environment captured by the camera and shown on the touchscreen. A communication unit of the user device allows multiple users to communicate with each other and share data such as a video stream that the camera is delivering, a relative position of the user device (as computed by the tracking algorithm running on the processing unit), and a 3D reconstruction of the environment of the user device so that it can be represented on a remote location. The user device is coupled to or configured to couple to a server network (such as the internet), that allows the user devices to connected to each other and to share the described data.

The system or user device described above may create and share a digital representation of the environment of the user device. In some embodiments, SLAM may be used to calculate a relative pose of the user device in respect to the environment and to generate a rough representation of the visible surfaces of the environment in 3D. As soon as the user is moving around in the environment with the camera of the user device activated, the user device or system may start building an internal 3D model of the environment. This 3D model may be used to calculate for each frame where the camera is relative to the environment (e.g., calculate the pose of the camera). The system or user device may also create an annotation for an object in the environment. The users may be able to draw annotations on the touchscreen while they are looking "through" the touchscreen onto the environment. In many cases, the users may draw outlines around the object, arrows pointing towards the object, or crosses on top of the object to identify it. In some embodiments, the users may automatically verbally identify a name of the object and/or an action associated with the object. For example, the user may say "look here, this is a . . . !" or "please turn that red knob!" or "please press this button!" or "you need to open this screw!" While the users are providing verbal annotations, they may also draw the annotations to indicate which object(s) is really meant with "this." The system or user device may use both inputs and timely relationship between the two to identify what object was really being indicated.

The system or user device may perform multiple steps when creating annotations. For example, the system or user device may identify commonly used shapes or symbols (e.g., circle, arrow, cross) by using a classifier on the drawn strokes or annotations. Additionally, the system or user device may identify the point of reference from the shapes or symbols (i.e. the tip of the arrow, the center of the circle, the crossing point of the cross, or, if no shapes or symbols were identified, the center of mass of the drawing). Furthermore, the system or the user device may run a voice recognition method on the sound input with a window (e.g., of a few seconds before and after the shape or symbol was drawn) to identify nouns and verbs in a verbal comment. The system and user device may use the nouns to generate annotations displayed as a label text. In some embodiments, the annotations may include a leader line starting at the reference point leading to the label text. The system and user device may use the verbs to display little icons that visualize what actions are to be performed close to the reference point of the drawn shape or symbol.

In some situations, the system and/or user device may use a trained neural network associated with the label text to segment out image areas that fit to the label text and highlight the one area that contains the reference point. Accordingly, the object will be highlighted. Where the user has drawn an outline, the system or user device may identify edges of the object that are closest to the drawn outline and replace the drawn outline with those edges. The combination of the "new" drawn outline together with the label text may be provided as additional training input to improve the neural network.

The system and/or user device may track annotation within subsequent image frames using patch tracking of the segmented area. Alternatively, or additionally, the device or system may project the annotation onto the 3D reconstruction of the environment and/or share a 3D representation of the annotation with other participating users, so that all users are able to visualize the annotations within their own environments or fields of view even if the users are looking at the annotations from different viewpoints. In situations when the viewpoint changed more than a predefined threshold from the viewpoint the annotation was created, the system or device may update the 3D representation of the highlight area by again using the neural network to classify the camera image from the new user's position.

In some embodiments, the system and user device may determine how/when to maintain annotations. In some instances, the user may change the environment during a session. For example, in a maintenance or repair session, the user may remove parts or opening compartments, or reposition items. If an annotation was provided for a part that was removed in a subsequent step, the user device and/or system may be configured to remove the annotation once the step is performed. The system or user device may perform this removal automatically by scanning the environment or wait for a trigger from the user. For example, at regular intervals (e.g., every second), the system or user device may perform (for each annotation visible in the view of any user) a search request in an associated neural network to obtain a new segmentation for the current camera image. If there is no positive segmentation area provided under the reference point of the annotation over a sequence of subsequent frames, we can safely assume that the object has been removed and the associated annotation should not be displayed any more. Alternatively, or additionally, if the user is prompted with a request about removing a part or completing a step, the user's response may be used to remove the annotation. Alternatively, or additionally, the user may provide feedback as steps are completed to indicate to the system or user device that an annotation may be removed.

Environment-Indexed Database of Shared AR Sessions

A user of a user device in an environment may wish to use the user device to view objects in the environment in augmented reality (AR). For example, the user may hold the user device up to view a street corner while traveling and obtain a translation of street signs and restaurant names. Additionally, or alternatively, the user may be performing maintenance on a product and use the user device to identify individual parts of the product for ordering and replacement by pointing the user device at the product. In such instances, the touchscreen of the user device may show the street corner or product as viewed by the camera of the user device and include annotations in the way of translations or part labels, etc. These products or objects associated with these annotations may be identified using visual object recognition.

Visual object recognition may be difficult to perform quickly and efficiently. Methods utilizing Deep Neural Networks (DNNs) may more efficiently perform visual object recognition. However, DNNs may utilize labeled input images as training data, where accuracy of the visual object recognition is dependent at least in part on an amount of training data provided. Training the DNN may be a tedious and labor intensive process, requiring the obtaining of and providing of the labeled input images. The labeled input images may comprise an image having one or more objects displayed in the image labeled with a label that is to be used by the DNN to identify that object. For example, to train the DNN to visually identify a red tricycle in an image, the DNN will need to be provided with an imaging have a red tricycle that is labeled in the image. Accordingly, much effort is expended obtaining labeled pictures to input into the DNN for training.

In some embodiments, a user may annotate various objects with labels before sharing the annotations with other users. These annotations may be used as the labeled images for input into the DNN. For example, when the user annotates an object in the interior of a car as a steering wheel and communications the annotation to the other user, one or more of the annotation, the target object, and the environment may be input into the DNN for training. Accordingly, the DNN may be trained to identify steering wheels in images.

In some embodiments, the remote assistant application described herein may allow users to help each other and at the same time. In user, the application may automatically generate such training images and labels as a byproduct, as described in the example above. Since the application may be used in many different environments and by many different people around the world, the application may generate various training images for deep learning by the DNN.

Once the DNN is trained, the DNN may be used to perform object recognition in an unrestricted environment. The DNN may compare images with/without objects to identify when the object exists in one picture but not in the other picture. Accordingly, DNNs may provide a method for performing visual object recognition.

Alternatively, or additionally, visual object recognition may be performed via database searching where the database is generated based on images received with pre-identified labels. For example, when the user is on a street corner in Paris, there may exist a database or listing of all objects at that particular street corner. In some embodiments, the location of the user may be determined by GPS or some other positioning method. The user's position or location may be used to search for a corresponding database for that position or location. When the database is found or identified, the user device may display annotations and/or labels for all objects viewed via the user device, assuming annotations and/or labels exist for all the objects.

In some embodiments, the user of the remote assistant application may annotate various objects with labels before sharing the annotations with other users. In use, the application may automatically generate a database of such images, objects, labels, and the tracking map. This information may allow for the generation of a database of locations and objects so that object recognition can be performed based on the stored labels, images, and locations. In some embodiments, the DNN visual object recognition may be combined with the location database.

In some embodiments, one or both of the DNN image input and the location database may be further benefited when a user provides some verbal instructions. For example, when the user is capturing an image or video, the sound sequence associated with the captured image or video may provide additional annotations or labels. For example, the user may identify one or more objects in the image or video verbally while they are annotating (e.g., the user may instruct to "open that compartment" or "turn that handle"). Accordingly, voice-to-text programs or algorithms may be used to analyze the sound sequence captured in association with the image or video and identify nouns that can be attached as labels to the image or video. Additionally, or alternatively, geolocation of the images or video may also be captured based on the user's position or location. The labels and objects being labeled may be associated with that geolocation. In some embodiments, the geolocation may be used in combination with object recognition from DNNs to filter results based on the location of the user. For example, there exist several Eifel Towers (and replicas) in the world. Based on visual object recognition alone, the DNN may not be able to distinguish from the Eifel Tower in Paris and the Eifel Tower in Las Vegas. However, the two Eifel Tower's may be easily distinguished based on their locations.

In some embodiments, simultaneous localization and mapping (SLAM) may provide tracking of the user device relative to the environment. This localization and mapping may be used to generate a rough 3D reconstruction of the environment. Accordingly, a rough 3D model of the environment, including many visual features describing the environment uniquely, may be generated. Such 3D reconstructions or models can be stored in a geolocation indexed database, for example using the geolocation of the user as an index.

In operation, the user device may be used for object recognition in AR contexts using a DNN or by accessing a geolocated database with labels for all objects at that location. The DNN based object recognition may utilize the labeled training images provided by the remote assistant application to identify labels of objects being viewed by the user device. The geolocation database may store additional information about the object (e.g., indexed by the object label), including geolocation information for the object. In some embodiments, the database may be filtered according to geolocation to identify objects at that geolocation, which are then compared to an image captured by the user device camera to determine what objects are shown that are also in the database. In some embodiments, the database may store environment maps and may be filtered or searched by the geolocation to retrieve an environment map of that particular geolocation. Once the environment map is retrieved, it is loaded the user device compares features of objects identified in an image captured by the camera of the user device with information from the environment map. When there is a match of objects in the image to information in the environment map, find the geometric relationship (pose) of the device relative to the environment. The user device then displays information from the environment map for objects that are visible within the view of the current camera image.

Shared AR Device—Further Comments

Consider a dedicated shared augmented reality device in the form of a circular looking glass. This can be similar to a prior device called the NeoBear Magnifier NEO which is basically a screen with a camera and it connects to a mobile phone so you can run an application on the mobile phone. Then you can give this device to a child and this application would recognize some nice playing cards and display some animals on top of it, and the children would basically be able to just handle the device without the need to know how to operate a mobile phone or something, they just go out and detect things.

Here, the form factor is helpful for shared augmented reality sessions especially for elderly persons that need help actually and that also might not be able to deal with complicated user interfaces on mobile phones. So one of the ideas here is to use that form factor for shared augmented reality to pre-configure a shared augmented reality application so that it can use the object initiated call to allow elderly persons, whenever they point at things that they need help with, to trigger a call immediately to their sons or daughters and they would basically be there and help them.

And the nice thing is that, so the form factor and the ease of use is here are distinct advantages, and it will be fulfilled by putting together some of the concepts related to object initiated communication where you can point your camera at an object and it can semi-automatically call someone pre-configured in a database. And we have this device which has a form factor that is easy to use, having a camera in the center of the screen on the backside so that elderly persons can even reach into the view of the camera. If you have done that with a mobile phone or even with an iPad, if you have done it once you will immediately understand that what the problem is here. The camera is located somewhere on the side of the device, and in augmented reality you have the feeling that you are looking through the device basically, but as soon as you reach into the camera's view with your hand, the relationship between your hand position and what you are seeing on the screen does not match anymore because the camera has an offset from the center of the screen, the camera is sitting somewhere on the corner on the backside of an iPhone.

And this is true for many mobile phones. So one of the key aspects here is to have the camera in the center of the screen so that you really have a kind of a "look-through" feeling like in a real looking glass and you can reach into the view. And for elderly persons, who may not even tackle the idea of having annotations on their side, but just allow the elderly persons to reach into the view of the device and say "this", and point at an object with their finger there, and have a feeling looking through this looking glass. And so in one aspect, this is a combination of two technologies, shared augmented reality on the one hand and this form factor on the other hand.

So when you are using the looking glass to look at something and you can see your hand on the other hand and it is centered well and you can point at something and say "look at this". And so, rather than the traditional annotating like drawing on your screen, the device can include voice recognition in combination with object and/or hand/object recognition so if the user points to something and says "what's this?", then there might be some sort of algorithm in the background that would automatically add an annotation based on that input rather than drawing with your finger.

The discussed form factor is a possible form factor for shared augmented reality in general and especially for object initiated communication it can make it even easier for people to call each other. In particular, most of the time of elderly persons who would call their children so it would be a pre-configuration that is done for them and it would just, they may have the same problem with their medication so as soon as they are pointing at a medication it will trigger the call to the child and say, "hey I again mixed the pills up, can you help me", and the child says "well, the pink ones", "you mean this one", and he's reaching in with a finger.

There are other form factors which may not be a circular screen. For example, traditional cameras and screens can be used rather than a specific special purpose screen. You can get an off-the-shelf touch sensor display with a rectangular screen in a device that might have a handle on it and a camera in the back. So it could be a kind of a rectangular screen with the handle and the camera in the center of the screen on the back side. However, the circular screen is really kind of matching the intuition this is a looking glass.

User Interface Sharing—Further Comments

This is about head-mounted displays versus hand-held devices. If you think about a shared augmented reality session or almost any AR, there might be always a part where there is administrative work, especially in a shared augmented reality session you might have, you might want to fetch your work order, you might login and so do some administration stuff before you actually do something related to maintenance. And then you say okay, I start working and then there is a lot of things that you might need to do before you actually need this help from the helper. And if you think about that if you would have only a head-mounted display at your disposal because you want to have this help session hands-free, and you would like to get the instructions while you are working with your hands, then the natural choice for such a thing is a head-mounted display.

But a head-mounted display may lack a very powerful user interface so there is no touch screen and there may be little that it can do other than voice input and some gestures that work but it can be hard to type text and things like that. So one aspect is basically to combine both devices and to use both, so you have your mobile phone or your tablet and you have your head mount display.

And you would basically start the shared augmented reality session or maybe in general any AR session by doing your administrative stuff first on the mobile phone. So you say I am the user XYZ, this is my password, what is my work order today, oh I need to go to the customer XYZ what is the problem there, you read the problem in your .pdf file, you start to do the administrative stuff you might even read some manuals there and then you are starting to get to the a problem that requires the performance of manual tasks. You can even use your mobile phone to call the helper and because the contact information is in your address book, and then if the helper is connecting you can put on your head-mounted display and transfer the connected call/session to the head-mounted display.

And now you can do any aspects related to shared augmented reality, like receiving annotations while you are working since you have a head-mounted display, these annotations will kind of appear in front in your view, you could work immediately, and the helper can see what you are doing because he is looking through your camera. So there is no need to put away the device and the helper is seeing what you are doing, he can warn you immediately to not perform an action because you might have misunderstood something and things like that.

But as soon as you are finished with the help session you might want to go back to your mobile device and use that to kind of say okay, I completed the work order, this was my time that it took me and things like that. So one of the ideas here in general is to use basically both devices and a communication scheme that allows or a specific architecture that allows any application that is running on a mobile phone or a tablet to send AR experiences to a head-mounted display to another application that is running on the head-mounted display and execute on the head-mounted display. And one of these applications might be a kind of a communication session with a helper where the helper is already dialed in and the only thing that it needs to do is basically track the environment and so do anything connected to a shared augmented reality help session.

So these aspects may be related to a system level concept, the idea where we have a mobile phone with a running application and we have a head-mounted display, a head-mounted display that is running another application that is able to receive descriptions for AR sessions and there is a dedicated application with some dedicated functionality that it can do, tracking displaying content, that is coming from somewhere. But the head-mounted display may also have a limited functionality so that it can be pre-implemented basically and so the, and it can a received AR application and then after a while it could finish the task at hand and will be silent again.

There may be head-mounted displays that have a processing unit somewhere connected to them and they try to cover everything, such as run self-reliant software, but one disadvantage of that is that you have all these administrative tasks and whenever you need to read, type and do things which may be very tedious on the head-mounted display. And, so one aspect would be that we have these two devices that both have some intelligence but the head-mounted display may have a dedicated light application running that is basically able to do AR, and that runs AR experiences because this is what it is good at from a device point of view. In the idea of two scenarios, the one is basically a simple repair scenario where there is a single user frame and also the remote assistant scenario is one use case with that.

So these two devices don't need to have the same capabilities, it is really that the head-mounted display may have only the capability of doing AR, of running AR experiences, and this may be a limited functionality so interactions may be limited with the head-mounted display running these AR experiences and therefore it could be a dedicated device with a dedicated hardware software configuration.

Low Power Mode and Suspending Tracking—Further Comments

So one aspect that we are tackling here is during a shared augmented reality session, if you have tablet in your hand or a mobile phone there may be instructions from the helper and the helpee will follow the instructions so he might use his two hands to perform a manual task and this means he will put away the tablet or the mobile phone—put the mobile phone in his pocket or put the tablet somewhere next to him on a table or something to do the manual task. And then he will grab the mobile phone hold it up to view the object at which point the AR application will recognize the features again and will display the annotations again on the object. But during the phase where he puts away the tablet there is nothing that the camera can see—maybe the camera is pointing towards a table or it put in his pocket—it might be black completely. So the camera may have lost the environment that it was tracking before and it may continuously attempt to recognize new things—and this is a very complex algorithm required to find these new objects again in the camera image—this really drains the battery.

So one aspect here is to use the inertial measurement unit (IMU) in the device to figure out that the device have been put away so it is the device is laying still on the table and the camera is black means we are not trying to do all the complex algorithms that we are usually doing if you don't see anything in the camera image. But we are switching off all the efforts automatically and in this way spare the batteries and processing power, and as soon as the IMU is telling us hey this device is moving again we start the activities so that we really basically do nothing while the device is put away. This concept may be just generally related to any augmented reality or maybe even simultaneous localization and mapping (SLAM) type of situations. But it often happens in shared augmented reality because you really do this kind of—it might be a step by step instruction application too where this happens but usually if you do any other situation usually people are holding the camera towards the object because there is something happening and then if there is nothing to do anymore the AR session is ending but in this case you have this period possibly these periods where people are putting away the device. The type of situation when shared augmented reality is used may be more say predisposed to this problem occurring.

So in a low power mode might include stopping the normal SLAM tracking etc. or if for example you put your phone down on the desk so the camera is black but you could still see the screen while you are doing some sort of work on whatever mechanical device you are doing so you could display the previous instructions. There is another aspect where you would shut down the SLAM tracker and the relocalization that is running at that time, but you would basically switch the screen to a maybe one of the key frames that you have captured before so that the user has an overview or the helpee has an overview of the environment and he sees all the annotations that someone has drawn before. So for example he annotates the inspections to open up for screws 1, 2, 3, 4—the helper has nicely annotated those and now he's putting the device away—there is no camera tracking at all but we could go back to the last annotation that was done or the last key frame that was taken with the annotations and display that as a static image so that the user and the helpee have that as a reference. This was the one aspect so he has like a little manual next to him where he still see screw 1, screw 2, screw 3, screw 4 and he can basically look back and forth to the real environment and do what he's supposed to do so this would be the one idea. The other idea was also the helper doesn't get anything during that period of time when the device is put to the task it is the camera might be black so the input stream from the helpee is basically black and we could use that to switch to a virtual navigational mode for the helper mainly meaning we would display one of the key frames that was taken before so that also the helper is seeing something also that the camera is not pointing to anything.

Another related aspect is just to have like a freeze button on the helper side so when they're going to go and do a task they can hit the freeze button, the image then reverts to the last captured image but also allows virtual navigation on the helper side so they can browse around what they were looking at and still see the annotations that the helpee has put in and maybe even the helpee at the same time can continue to annotate the captured virtual navigation images. So that while the iPad is sitting on the desk you know the helpee can kind of manipulate and pan around a little bit showing the helper or the helper can pan around the captured key frames and of course in this freeze mode we're not going to be doing SLAM so there is no power being used. So in one aspect it is done automatically and another aspect would be an actual freeze button right since in many a case the camera still sees something in the background or it is over the edge of the table who knows or maybe you know it might be hard to detect whether to turn the camera off maybe the user wants to actively freeze regardless of what the camera's looking at or whether the camera's moving around. So in one of the aspects now while the helpee is working and has his hands on the screwdrivers and tools he could still talk to the helper and the helper could give him additional instructions and even to annotations about that they will now appear in the view but will appear on screen. So in the one aspect, we're going to switch off computer vision right when we hit freeze but and we could also have this work in an automatic mode where the system detects itself that it is not being used and it either just switches off the computer algorithm or moves into this virtual environment where both people share the virtual environment.

Virtual Navigation of a Remote Individual—Further Comments

In this aspect we would like to represent the helper on the helpee side and the way we may do it is basically since we know where a helper is looking—so let's go back to the to our virtual navigation thing—there is these captured key frames that the helper has made for himself to navigate around in three dimensional space. And since he is doing this and he's doing that by clicking on one of these key frames and then drawing some annotations there or just looking at it but have selected one of those key frames but doing that he is kind of defining his three dimensional position in the environment. Because by selecting a key frame he is selecting the position of that frame in the environment—for each key frame we know where it was with respect to the environment when the frame was captured so basically by clicking on a key frame the helper tells us where he virtually is and or through which window he is viewing the environment which is basically giving us a position. And as soon as he's drawing an annotation and we are projecting the annotation into the three dimensional space we again have something that gives us a three dimensional location of some activities that the helper is doing.

And so taking all this information and transport it back to the helpee we are able to represent the helper, for example, as an avatar. So there could be the head of the helper displayed at the position where the key frame was taken when the environment was captured. So we know where the helper is—we could display a hand icon or representation while he's drawing an annotation so that we really have something like an avatar. And on top of that in one aspect we could use three dimensional sound to locate the sound source of the helper's voice to the position where his head is basically in three dimensional space. And so one aspect is the combination with the helper's virtual navigation tracker that we are keeping so that the helper is able to navigate on the one hand and at the same time he is able to communicate his virtual position in the three dimensional space in the environment of the helpee. So in one aspect, we have virtual navigation of the helper in the three dimensional environment and having avatar represented is just one outcome of having this virtual navigation.

And so in one aspect you can localize the helper, etc. within the environment and the user can see the avatar and/or hear the position and things like that which can make the user experience a little bit more rich. But in an application of this aspect, if this is a larger machine then then virtual navigation has allowed the helpee to achieve a quicker understanding of what the helper is doing and saying—if he knows that the helper is somewhere over there and all of a sudden at the backside of the machine. Whereas the helpee is on the front side of the machine and all of a sudden the helper says "look here—here it is I found it—this is the part that you need to make do first" then just kind of moving your head as the helpee a little bit around and understand where the helper is makes you maybe understand where you need to go and look.

Actually so there is again this "look here" power that the whole system actually has even if the machine is bigger and these two might be a located in different places—this does really make sense if the machine is big. If the machine is very small then the object is very small then most of the time they will look through the same screen there may not be any virtual navigation. But if the machine is bigger and the helper starts to use this virtual navigation more and more it can be beneficial to kind of have a more precise communication—think of a crime site in an extreme case—the helpee would be on the crime site and he can reconstruct the crime site for the helping experts somewhere in another town. And now the helper can of look around and look for some small evidence that the helpee, being unexperienced, might not be able to find. And then all of a sudden the helper finds it he might say "hey I am here and look at that here" and this might be easier than kind of starting to describe where to go and where to look and things like that.

So let's suppose we have the helpee (the person on site) just move from one perspective to another—let's use our 90° examples—staying the same distance from the screw head—90° but I guess if it was less than 90° you know 5, 6, 7, 8, 9, 10, 15° depending upon the angle the perspective of the camera and how wide angle view the original position of where the helper is now would not be visible in the camera. So in one aspect the system can push the avatar closer to the object so that the helpee's position is always in the field of view. So the avatar can be close enough to the object so it is always in the field of view. However, if the avatar is very close then the helper might stand really in the way in the view to look at the object. In one aspect, the avatar may only be displayed when the helper moves into a virtual navigation mode and is looking at a different perspective than the helpee right—which may not always be the case. And in another aspect, instead of using a virtual avatar you could just use an arrow that appears whenever the helper is looking from a different perspective indicating the field of view of the helper—which might be a little less intrusive than an avatar. The arrow can also include or be presented with an indicative icon, such as an icon of an eye to indicate that this is the helper's view perspective.

There are a number of possible forms for the display. But one aspect is basically the idea to generate a three dimensional position out of the fact that the helper is using the virtual navigation—so you could imagine there is a helper in the virtual environment so that you can track motions and he will basically see the 3D constructions the 3D reconstructions in the virtual environment. The helper can annotate there as one of the possible implementations of shared augmented reality and then one aspect is to re-project the position of the helper into the environment. But since in certain cases these helpers are sitting in front of maybe a tablet screen or maybe in front of a PC and he's clicking around on a window here a determination must be made to generate the 3D position that you need to display. If this that his representation and that getting his location of where he is at the moment to give the helpee a little bit more feeling about what the helper is doing—the helper could say just follow me and click on one of the key frame's that have been stored. The helper can navigate to somewhere else and the helpee can follow him basically so it is normal user to user communication that they are using without learning any additional things that they need to operate with.

And so one useful application for this is when the helper wants to move wherever the helpee is so go to a different part of the machine, etc. follow me to this location and so in one aspect the helper is able to toggle on or off the avatar because if the helpee's going to be standing in the same spot and the helper's going to view looking over his shoulder, it might not be as useful or might get in the way. And so in one aspect, the helper has the option to turn on and off the avatar in useful situations. In another aspect, the helpee may be allowed to move either the avatar or the arrow—and just slide it to the side so it is pointing in the same direction but not obscuring something. So the arrow could be on the same ray as the helpee's perspective.

In certain embodiments, whenever someone is drawing an annotation and this annotation is outside of the screen there may be little arrows that pointed into the direction of where the annotation is in the environment so and on the board of the screen so you have a little green arrow pointing to the left on the left side of the screen and you knew that if you now rotate your device into this direction you would sooner or later see the actual annotation that is there and so this was his way of representing it. And so there may be two types of arrows to help to understand where the helper is so it does help to generate the feeling that the helper is really with me in the same room. But the form of the visualization of the avatar is not limited, you can have a three dimensional position and orientation of the avatar at hand as soon as the helper is using virtual navigation, the helpee can visualize the location of the helper.

Shared AR Session Recording—Further Comments

Shared augmented reality is a remote assistant system that allows a helper to help someone—a helpee we called it. The helper helps a helpee who is on the other side of a digital line, and both are using augmented reality to communicate with each other. The whole system consists basically of a mobile phone or a mobile device on the helpee side so that the helpee is able to point his camera to the environment that he needs help with and share this video stream with the helper. In the one direction, the helper sees what the helpee sees and in the other direction there might be a section with video of what the helper is doing (so the helpee can view the helper's actions) but it is not really important to show the face of the helper to the helpee. However, in augmented reality, we are using the view input to track the position of the camera relative to the environment. Each camera image is analyzed and we find some visual features that can be recognized in the next frame so we are able to find these visual features in the next frame. These features may be feature points. If there are more than four feature points— and usually there are more than four—then we use triangulation to compute the camera's position relative to the environment for each frame. At the same time, we are able to reconstruct these feature positions and the camera position in three dimensional space. This technique is called simultaneous localization and mapping (SLAM).

Using this technology, we know at any time that the helpee is pointing the camera to an object where this camera is relative to the environment and we are slowly reconstructing the environment. As the camera is moving around, there is a chance that we can triangulate these visual features and we can reconstruct the environment. Accordingly, just by looking at the environment, we are generating what we call a map of the environment. This map consists of feature points that we basically find in the image and find in the next image so we can do a triangulation and with that it allows us to have a 3D positional map of the environment (what we call an environment map). The 3D points represent the environment that the helpee is looking at and there is also a technique to kind of interpolate this between points so that you get what we call a rough preview or presentation of the environment. It is a digital representation like you would scan in digital form. We are sharing not only the video feed with the helper but we also sharing a 3D representation with the helper so that whenever the helper looks at a video frame he will also know where his video frame is relative to the environment as if you image a 3D kind of a 3D representation lying behind any frame that he's receiving. The helper is able to draw annotations into the video—in the simplest form—into the videos that he's receiving. Since there is a 3D representation behind that video the helper is basically drawing an annotation like a circle or a cross or something on, we can project this annotation that the helper is drawing on the 2D screen onto the 3D representation of the environment and get a third dimension for this annotation basically. So it would basically would be the same as he would be able to draw in the 3D environment onto the surface of the object. We then communicate this annotation back with its 3D position to the helpee and display this annotation as an augmentation (e.g., as additional graphics), basically the video overlay, on top of what the helpee is seeing. The annotation is basically rendered as a graphic item that is located in the 3D space. If the helpee is moving around, the helpee would basically perceive this annotation as sticking in the real world as if someone has painted something on the surface of the object in his real world.

The helper could now choose two things—(1) he can choose to just look at the video as it comes so he would basically in time see exactly what the helpee is looking at or (2) he can choose to look at the 3D representation of the object and basically see what the helpee is doing. The helper can also take snapshots of any time, which would be this frame basically and it is not only a video print but also knows where the camera was in free space and also includes the video frame that knows how the 3D environment looks behind it. So this means that since the helper is able to look at either the video feed as it comes in or look at any of his snapshots that he has taken in the past, he basically is able to do what we call virtual navigation to navigate in this 3D space without the constraint to where the helpee is or is looking at the moment. This concept allows the helper to kind of store some of the incoming key frames or some of the incoming frames while the helpee is looking around basically and this would give the helper a very nice overview of the situation and he can navigate from one view to the other basically and this is what we call virtual navigation.

In some embodiments, the snapshots created by the helper may be manually taken by the helper or may also be automatically taken by the system. In some systems, the snapshots may be taken automatically when the helper is drawing an annotation. Sometimes, as soon as the helper starts drawing, the helper wants to have a still frame anyhow and it seems this is an important frame that he was has chosen to annotate something so this would be a key frame. Alternatively, the helper can also click on whenever he thinks this is something that he will need for future reference and it will be stored with a manual click from the helper. In some embodiments, the snapshots may be a single image frame or video clips or segments (series or sequence of image frames). Additionally, the frame(s) include information regarding the position of the camera and/or the annotation located in the 3D space relative to the environment.

In some embodiments, the helper may have the ability to move the perspective so that he's looking at something different than the helpee. This may occur when the helper receives the representation of the helpee environment. For example, the helpee's camera might be trained right on the engine whereas the helper may want to look to the side and look at the center of the car or the hood or the battery or something different than what the helpee is looking at. Thus, these snapshots basically allow the helper or helpee to navigate around because the snapshots from the specific views include the position of the camera. Thus, the system has the 3D representation of the object and can track the position of the camera relative to the environment and object for the snapshot. In some embodiments, you could even have a little visual transition from one snapshot to the other by virtually rendering frames in-between from the 3D representation of the environment. Accordingly, the helper or helpee could navigate from this one key frame or from one snapshot to another one and there is no loss of moving of context. It would appear for the helper or helpee that they would basically control a virtual camera within this 3D environment by clicking on key frames and transitioning slowly from what he sees now to that new position.

The helpee may move his/her camera around capturing key frames to assemble a collage of images. This may be automatic or manual. With a sampling of the environment by the key frames, virtual navigation may be possible based on the camera position. The system (or helper or helpee) may sample 2D surface of the machine so that you have any viewing point on the machine being something that is kept there automatically or manually. In some embodiments, the captured aspects may be 6 dimensional (3D dimensional orientation and 3D dimensional position).

For example, a help session might be a repair session where a helper is helping someone else to do a sequence of steps. This would basically happen in the following way: the helpee would point his device onto his environment and the helper would create an annotation (e.g., would say "open this screw here" and while he's saying that he might circle a screw somewhere in the environment by drawing a little circle around the screw). The helpee would unscrew this screw and then the helper would say okay now open this screw (circling another screw) and then the third and then the fourth one. The helper may further instruct to pull away the hood, under which you will see three cables. The helper may instruct the helpee to take the red cable. These instructions may be conveyed via annotations, so the entire video will be a sequence of annotations that happen in the 3D space. Thus, the session may be more of a recording of an environment that consists of a 3D representation it would be a recording of an environment that has also this feature points that allow us to track from them. The features points also allow for playback (e.g., recognition of the environment again) of a saved session. The sequence of annotations plus the sounds or voice(s) may be stored with environmental data. This could be replayed if someone (new user) is pointing the device again on the same or similar environment. We could use the feature map to find the key feature points that we would match against the feature map that we stored and figured out where the new camera position is. Now replaying the session would basically play the sounds so that the new user could hear the audio while annotations are displayed at the same (original) places where the helper placed the annotations. Thus, the session may be replayed later without the helper being interacted with directly. The session may be replayed as step by step instructions or may be replayed including the verbal help plus the annotations. Since we are tracking the device and we are drawing the annotation on a video in 3D space based on the tracked viewing position of the device, the new user would perceive the annotations in the appropriate environment location from any angle so a new user don't need to go exactly at the point where the recording was taken from by the first helpee. The new user could stand anywhere in the environment and see the annotation in 3D space as an augmentation in the proper location.

In some embodiments, the video itself may not be recorded, but rather just the environment map and/or the associated metadata, sounds, annotations, feature points, etc. In some embodiments, the environment map may comprise key frames that are or may be linked together. The key frames may be part of the environment map and may be used to store the map and later used to re-localize the device in the environment. The key frame may be the camera frame that keeps together with the 2D locations of the point plot at 3D depth and the camera frames have also positions. A key point is described by its surrounding pixels or its surrounding. The key point may be a descriptor which is basically looking at the surrounding of the point in image and is encoding the surrounding descriptor to be a unique thing that can be identified in another key frame. All the key points of a frame may be captured in a key frame. Key frames may be captured with or without annotations. For example, a captured key frame may not include reference to any annotations by the helper. In some instances, the key frame may include audio/video information and object information (e.g., information to re-localize the user device). If there is no annotation, then the same coordinate frame may not be identified since that frame includes only the recording of the audio unless the user still wants to recognize the object.

These key frames are there to generate a 3D representation of the environment and basically what you are doing if you start you have a first key frame and this first key frame has some feature points in there that are specific points that we find for using a feature when finding the algorithm. If the camera is moving a little bit and you don't have any depth because it is just a 2D image and you don't know how far these feature points are away now, if you move the camera a bit you might see a similar feature again. A equation system may use the 2D position of the feature points in the one image and the feature points in the other image to figure out where these two cameras are in 3D space and at the same time where these feature points are in 3D space. Feature points plus the two camera systems are a linear system, so you get two camera positions in a 3D space plus the positions of each of the feature points in 3D space. As soon as you have those 3D feature points, every next camera frame is easy to compute because now you can find already known feature points in the next frame that where you know 3D positions in space so you can figure out by triangulation where the new camera frame is and from this new camera frame position you see new feature points that you might not have seen before or you might have seen before but you now are able to triangulate or have new ones that have just the 2D position at the moment but maybe will be found later. This is simultaneous localization and mapping (SLAM). Accordingly, while the camera is moving you are generating 3D feature point positions of the environment plus camera positions of images for the key frames that you are taking. Adjustment may be used to improves the whole process, which may include taking all the key frames that you have where you have positions in 3D space and they all see the feature points and iterate to optimize the position of these of the whole system so that errors are minimal. Accordingly, you get every position of the camera and better positions of the key frames and results in a better fitting into what the actual environment.

Feature points may provide for playing back previous shared augmented reality sessions in the same environment. The localization information of the user for playing back that the shared augmented reality including the annotations is included in the playback. This provides for attaching the annotations to the right object etc. so it can localize where the user's playing back the previous sessions from and in that way basically locates the user and all the annotations etc. within the 3D environment that was generated by those feature points and the key frames that were taken in the first shared augmented reality session.

The camera may be localized relative to the environment and then all the annotations are localized relative to the environment so this means if you know where the camera is relative to the environment you can also render the annotations that are 3D in 3D space. You can render them using this camera position. The camera is here in my environment, my content is here, please render it. The system would then basically project the annotations correctly onto the screen. In some embodiments, only the feature points in 3D space are saved because you want to re-localize the annotations and the camera if you come back to the same environment. The camera pointed in the environment and the feature points of the new camera are compared with the saved feature points (there may be an algorithm detail if to determine there is key frames needed or not) and then as soon as we have a camera position identified the annotations are also defined in 3D space. Thus, you may only need the positional relationship between the annotations and the feature point positions.

In some embodiments, once you have analyzed the key frames, they may be deleted after the relationships between the annotations and feature points are determined. One other aspect is that there may be some flexibility in timing. For example, key audio off of recognition of an object and the timing of audio or the timing of annotations. There may be a temporal relationship with respect to the start of the augmented reality session. In some embodiments, the system may key annotations and audio off of actual recognition of objects meaning once an object or feature point is recognized in the video, an audio or annotation sequence may be initiated. Alternatively, the system may respond to user responses or indicators. In some embodiments, the system may not want to start the audio or start the annotations until the camera or helpee is in the right spot (identify feature points using SLAM (simultaneous location and mapping), etc.) and then it might take a while for example for the user or the helpee to do a certain task and move on to a next step so you know there just may be some pieces here with respect to temporal or timing of the replay that may be keyed off of things like you know the SLAM algorithm recognizing the environment of the feature points.

In some embodiments, once the object is recognized or one or more feature points are recognized, the system may replay the session from the beginning to the end. In some embodiments, the system may automatically cut away the sequences of the session that contain information when nobody was talking, for example, maybe the helpee was putting away the designs. While the screen is black and nothing can be seen, the system could cutaway and reduce a length of the session, making the session shorter so that it could be replayed without moments when nothing was happening.

Additionally, the same aspects may allow the user to replay the session during another help session so that a helper could start and stop the whole session. Accordingly, if the helper was helping a helpee #1 with a task and after an hour another helpee is calling with the same problem on the same machine, the helper may replay the recording from the first helpee and start it and stop it whenever needed without doing the same actions, etc., again. The next thing to do would be a little bit of editing. The editing may comprise editing audio plus annotation streams. The editing may break the audio and annotation streams into nice little pieces and say this is step #1, this is step #2, this is step #3 and step #4. The video may be fed into an application that allows the instructions to be displayed some buttons on the screen as a help key, allowing the helpee to control the session by saying a command or requesting the next step. The system may then play the annotation plus the sound. The helpee may press the button and play the next step or replay the previous one. The map of the environment without the annotation may be used to prepare the step by step instructions and basically prepare. Thus, the shared augmented reality session plus the recording of the environment may act as an anchor for the object tracking. In some embodiments, the system may use simultaneous localization and mapping without any prior knowledge of the environment with only information from the video and feature points.

In an additional embodiment, the system may reconstruct the 3D environment (e.g., of a large area) and the helper is looking around the room as the system performs simultaneous localization and mapping. Thus, the system is reconstructing the environment of that room and may replay a help session as a training scenario in a virtual reality environment using of a virtual reality device. There may not be any real environment tracking anymore but rather just head tracking relative to the room.

In some embodiments, the environment may include anything that has been captured. The instructions or annotations may include statements that the helpee "needs to remove this screw first and then this screw and then this screw and then you need to press this button and then you need to open up this valve" and things like that. The helpee may see at least the annotations plus sound that the helper made and this would be at least the basis of a learned session that could be later attained afterwards. The system may include a 3D recording of the environment plus the annotations of actions that occur. In some embodiments, the VR system may not save all of the video to reconstruct the environment but rather only the key frames and/or feature points to identify objects and locations. In some embodiments, the feature points that are 3D points are used for triangulated and the system assumes surfaces between the points. The key frames are used to project the texture of the key frames onto these triangles. In some embodiments, the system may choose the best key frames and project it nicely onto it and in this. In some embodiments, a few hundred feature points or a few thousand feature points are good enough. Sometimes it is based on the feature points and the 3D model that you generate some sort of surface on which you can overlay some of those key frame images and so it is kind of like a collage of those images mapped onto these surfaces to represent the environment that was taken in the previous shared augmented reality session. In some situations, these sessions may be stored as a new media type defined to include the necessary video, spatial, object, and annotation information. The media/data type may also include the three dimensional reconstruction information plus the audio plus the annotation in a sequence.

Shared AR Session Bandwidth Adjustment—Further Comments

Remote assistant systems can use video communication between the helper and the helpees. For example, there is a camera on the helmet and it is taking the video and it is transmitting the video to a remote assistant and he sees the video on the big screen in front of him or in front of a table. The remote assistant has a display that is basically flat on the table and above the table there is a camera and he is basically using his hand to point at things that he's seeing on the screen and the camera is capturing the screen plus his hand that is above the screen so. The captured video is transported back to the helpee and the helpee has a little screen. This screen may or may not be overlaying, just like a glass screen that is in the upper right corner where he sees basically what his camera is capturing plus the hand overlay.

Such a system would need a video stream in one direction, and another video stream in the other direction, there is not even the 3D representation and things like that, but this does not work, such systems that use video connection do not work if there is limited bandwidth. The first thing that you need to do is if you have limited bandwidth and these cases might be not unusual so there is people working in, such as a cave and mines, there is people working in power plants, so there is all kinds of remote locations where the coverage is really bad and all these systems fail in this case because if the bandwidth is not there you need to reduce the data that you need to transport and if you are relying on video then this means you would basically degrade the quality of the video. This means the remote assistant might not see all the details or in the worst case you would even need to switch off video. We know that from daily using video conferencing even from a very nice offices that have a very nice internet connection. So and as soon as this happens, these systems have a big problem because then it is voice alone and with voice alone there is really, it is really very hard to help someone else because you need to describe things, what you see and all kinds of stuff so it, in the least case it takes longer, in the worst case the helpee will do something wrong.

Our system has this property of doing a 3D representation or construction of the environment of the helpee and can be used for doing a limited bandwidth communication. For example, in one case is a really limited bandwidth so the helpee would basically scan the environment, build on the local device the 3D representation and then share the 3D representation to the helper. The sharing can be done during scanning or after scanning. So when the user is moving the camera a little bit and part of a 3D representation is generated, and only the 3D representation is shared, not the video. This 3D representation might include this kind of frames that allow the helper to do his virtual navigation basically. So the helper basically has a method to navigate through and look at the environment from his point of view and he's also able to do annotations and we can transport these annotations back because they are just a three dimensional representations, e.g., a little squiggle represented in three dimensional space. These representations are easy to transport over a low bandwidth network and on the other hand the helpee is able to still see the annotations and voice, I assume the voice is still working so this means the only thing that changes with our system and this limited bandwidth situation is that the helper has not the choice between live video and virtual navigation.

He will just have virtual navigation but there is still, he has still a powerful way to communicate visually with the helper in respect to the other systems. So this is the one case, if there is limited bandwidth and there is an extreme case where there is no bandwidth, e.g., you need to repair something in the cellar and there is no connection at all. So the idea here is that the helper, the helpee is going down in the cellar and scan the environment and build a 3D environment of 3D representation of the environment. And then he is coming up out of the cellar, goes somewhere where there is some connectivity again and now he is sharing the 3D representation of the environment with the helper. The helper could use either augmented reality or virtual reality. The helper is able to draw something in this three dimensional environment and share the drawing again as before with the helpee so they could basically plan the operation on this virtual representation so the helper could say the first step is you need to open the screw, the second step is you need to open this screw, and he marks it with first, second, third and so on. And if they are finished and the helpee is understanding what he needs to do he can go down into the cellar, hold his device against the real environment, where he would recognize it and would be able to display all the annotations in augmented reality on the places that they discussed before so he has all the annotations of the planning directly on the device and he could follow the instructions. Of course this works in a limited way because if he needs to open something and then there is a completely different situation then he might need to go up again and then share the new situation would be with a helper, but in general, well this is already a very extreme case for a remote assistant situation anyhow, but even that could be kind of covered with the set up that we have here.

In some instances, the data that's being transmitted in the limited bandwidth and maybe even the no connection bandwidth is very similar or maybe even the same as the data we're using for video playback of saved sessions. For example, in reduced connectivity situations, the systems may remove portions of the sessions that are not related or not necessary (e.g., no annotations or events) for helping and kind of condense the video. This might also be seen as another way of doing replay, so as a replay of a help session that is was generated on, in, at another time basically so the other time as a helpee walked out to have a connection, the help session could be generated there and the helpee could replay it and as a step by step instruction so this is just another use case basically of replaying it. The minimal bandwidth could be viewed as live replay not transferring video data but transferring all the data live that you would be using for the replay case.

In some embodiments, helpee may be in a good communication environment and may have some editing tools that allow them to generate step by step instructions already together so while the helper is explaining something saying, in step one you need to remove this screw and he is defining that as step one and then he says in step two you need to open this door and in step three you do this. And in this way the helper is already kind of defining a step by step structure and this could be used by replaying it that the helpee might really then get some buttons that say, or again say check, I have done the first step check, I've done the second step, I get the second step now displayed and I get now the third step displayed, so it is basically another version of this kind of capturing and replay.

In the minimum bandwidth implementation, only key frames may be communicated as opposed to no video of other systems. The key frames may be used in either AR or VR systems. The keyframes may be a synonym for the 3D representation that you send over, it is just another representation of the environment if you want. The key frame may contain images or 3D representations in some embodiments. In some embodiments, if the helper is creating an annotation, this annotation should be anchored in 3D so that the helpee can see them when he is looking at them from his point of view, otherwise he would need to go to these key frames to receive these annotations correctly to the position where the quick key frames were taken so the key frames alone, just the images alone might not be enough. Thus, the key frames may include 3D representation data.

The helper has a 3D representation, it is a computer graphics representation, the digital representation in 3D of the environment. Basically it is like you would have scanned the environment, well you do it basically, you scan the environment in 3D and you send over the 3D model and he is having just the 3D model on his screen. And now he is able to kind of annotate something in this 3D model and as soon as he is doing that he would, these 3D annotations will go back to the help key and he will see it in his environment. This can just work using SLAM, in which case there is no object recognition or CAD data here based upon which they're creating the environment, this is just some 3D representation.

How does this look to the end user? You need to imagine a very rough 3D representation that is basically using feature points, there are not many points that you are basically taking from the environment and you triangulate in between and you are basically painting the picture of this, of the real object onto this flat triangle so your world would be a very rough representation of the real world and it might look a little bit odd and distorted. So the real 3D representation might not be good enough to, because if I would have on the helpee side a perfect 3D scanner, I could perfectly 3D scan the environment and send over 3D object and you would just use computer graphics, you would load it in your 3D editor basically and paint something on the 3D object, you would paint your annotations on the 3D object. And this is, the 3D position of your annotation will be sent back and that's fine. But this is not the case in our case, we are using SLAM with a very sparse point cloud that is generated and in between there is interpolations, basically triangles that represent maybe very complex things with the texture methods that represents, that is taken from one of the images so the 3D environment might not look very helpful in most of the cases but since we are also capturing these keyframes that are kind of anchored on these 3D representation, you would basically have keyframes that are perfect shots from one view so they are, they have nice pixels and they look like the real thing. You would navigate from one keyframe to the other but have in the background you have this 3D representation so whenever you are looking at one of the keyframes you would do an annotation on the keyframe but you would be able to re-project it to the backside, to the 3D object and therefore locate it. So the 3D representation is something a little bit strange because it is not a computer graphics representation of the object itself, it is a very imperfect representation of the object together with a few images of the object that are taken from specific viewpoints, basically.

The concept of the keyframe is really that it may be the image plus its location relative to the environment. It is not only an image because if it is an image then it may not be possible to determine the 3D position of the annotation that the helper is creating. It may be possible for the user to just literally take a video and then go when he has the connection and have the shared augmented reality session based upon a replaying of the video. And you could perform object detection or analysis at that point in time. But then you would have a separate screen where you basically look at the video and then you would look at the real environment, you would not be able to have it directly overlaid over the real world because the video was shot from one specific viewpoint and this means if you would like to have the overlay you would need to do the same motion with your head over the device as the video was done, so of course you could, this would be maybe this would be the solution for the video communication guys, they would go into the cellar, take a video, go up and upload the video to the helper to help it with annotated and would send the video back and they would now have the annotated video and now they would have basically the device lying next to the environment and replay the video like a YouTube video basically, and look at the video and then try to match what they see in the video with the real environment, whereas in our solution we will have the annotation is really on the object so they will stick on the object. The annotation is on the object as the user then, when they take the camera back down they again take the camera shot, a live shot, and the annotations would be live. If the user goes down into the cellar it would recognize the object, it would determine the position of the device at that point and it would now render all the annotations that were made from that point of view so that he/she would perceive them as being sticking on in the environment in the right place.

In some embodiments, the user just goes down and takes the video and then conceivably later, whatever, an hour later, that evening, next day they take that video conceivably the helpee could do a live shared augmented reality session just based upon the video and the helper could with the helpee have an interactive session walking through the video just to teach the helpee, oh here's how you do it. Now they know how to do it and they can go and take care of it without doing the live annotations. A shared augmented reality session may be based upon a captured video rather than live.

Associating Annotations With Recognized Objects—Further Comments

Mapping annotations may comprise taking annotations in a 2D space, e.g., when multiple users are drawing to identify something or try to follow an outline of an object or they might even draw an arrow or a little cross and say this thing here, but let's assume they're making an outline. Generally, the annotation is a 2D thing that is being drawn on a screen and it is either viewed by the helpee at the moment or one of the snapshots. But in AR or VR, these annotations may be placed in 3D space and if someone is drawing an outline this outline might be a little bit outside of the object and the annotation may be a little off the object. If the system were be able to reconstruct perfectly the outline, if it is projected into the 3D environment it would basically lay flat on the table and as soon as someone is looking at this thing from a side by moving around, it would not indicate that the drawing party meant the object if they look from another side. This really sometimes this is a problem and people have tried to figure out different techniques various techniques that are drawing on a plan that is kind of in a median distance and the distance is calculated kind of around this object and things like that but still if you would draw this line if you then walk around the object it will be projected and it would fall in a worst case group one single straight line and then you would not even see it anymore. To help make the annotations 3D, the system may identify the object being highlighted. For example, the system may use a database of known objects. As soon as someone is drawing an outline or a cross or an arrow, the system may basically analyze the area that is covered by the annotation and would go around or use an object recognition algorithm to figure out which object that is and as soon as the system knows the object the system would basically try to figure out the shape of the object for re-projecting it in all possible poses and see if it fits to the image and as soon as the system has that the system will have a 3D representation of the object that the user has meant and now it is easy to keep an outline of this object because the system has a 3D representation of the object. Then the system may keep an outline of the object at any position that a user might take and this means even if the helper is throwing an outline in one of his screenshots and the helpee is looking from a completely other angle he will see the object nicely outlined from his point of view.

In some embodiments, the system may do some object recognition within an image—once the system recognizes the object then references the CAD model for the object in order to know what parts are on or even underlying within the model perhaps even obscuring from view maybe it is something internal like an engine that you can't see from the outside. The system gives the user the ability to tap on the screen showing an image of the object. The system then basically projects a ray from the camera perspective through where the user tapped onto the image to figure out what parts are intersecting with that ray and based upon what parts intersect with the ray the system then present the user the option to basically select one of those parts and it could be the engine it could be a wheel whatever it is that intersects with the ray and then the system can highlight kind of with an outline that part and as the user then continues to move around the object the system keeps the part highlighted to maintain its visibility and again it could be an outline or something that's internal or it could be something that's even external and visible to the user. The system, thus, may utilize CAD data and/or object recognition data.

In some embodiments, the system may enable the remote helper or the helpee to outline objects. In some embodiments, this may be used in shared augmented reality sessions or in other sessions. Thus, such highlighting or outline may work in a plain old regular AR or VR session. Thus, the helper that is identifying the location on the screen of the helpee and the system in turn is leveraging either object recognition or a CAD model to then highlight some part. Additionally, or alternatively, the user may draw a circle around an object and the system may properly track the object and the annotated circle as the user moves about the object in the same relative position between the user and the object.

In some embodiments, the system may have to know something about the object itself and may have to be using object recognition data or using CAD data in order to identify and track objects and annotations. In some embodiments, the system may use billboarding, where the two dimensional annotation maintains its orientation with relation to the user. For example, the annotation may always be normal to the user to the view of the user as if it is a billboard that the user is always able to read.

Automatic Management of Annotations—Further Comments

There are different ways of creating annotations. When creating annotations, there may be a map plus the 3D representation and this means whenever a helper is doing an annotation on the flat screen, the system is able to re-project it onto the environment and have a three dimensional representation of the annotation and would basically be able to locate the annotation, the drawing into the free space. The system may include a process of creating and maintaining these annotations. In many situations, people will draw circles or outlines around an object and at the same time they would say something related to that object, for example they would say, push that button here or they would say, open this lever or unscrew this screw here. And they would circle that. So actually they would provide two kinds of information at the same time. They would draw and indicate either the shape or at least the location and the image and they would say something, so if you do a speech to text conversion there will be verbs in the sentences that are generated around or said around the drawing time, and there will be nouns. And the idea here is to use the nouns, like open the screw, to label the object automatically. So a user could kind of draw over the screw and say, unscrew this screw, and the system would recognize screw and would put screw as a label next to the drawing, with a leading line to the screw. The leader line may point to the significant point or center point or something of the annotation, so if you draw a circle you could basically say well, where is the center of that, if you draw an X there is a clear point that you make, if you draw an arrow there is the tip of the arrow. All these are indicating basically points in the image where you believe there is, it is an anchor point basically for the leader line. So in this way, the helper would be able to label things and this is also the way how labels are generated for deep learning as well. And there is also verbs that the system could use, for example, push or unscrew or things like that, and for these verbs the system might have little icons or animations that could also be placed next to the annotation so that it is basically, there is a visual representation of the talking, of the, what the helper said. And okay, so this was a reference point from the voice recognition, you use the mouth. The system then tracks the annotations within the subsequent frames, meaning the combination of plan map plus what we call a pair striker are utilized. The system may compute the projection of the annotation onto the 3D representation of the environment and in this way generate a 3D representation of the annotation and would basically then track the annotation and the camera relative to the environment and therefore know where the annotation is. In projecting the annotation onto the 3D reconstruction of the environment, the annotation and the 3D representation of the environment may be shared with other participant parties.

The annotation would be shared so that the other side could see it. Thus, the annotation plus the voice that is saying something during the annotation basically creates labels. And subsequently, the annotations and labels may be used to feed into a deep learning environment. That, combined with object recognition, may allow someone to just tap on things in a subsequent session and they would immediately get a label. So this is basically an input for learning, but at the same time the more people in a shared augmented reality session would talk about screws and circle these screws, the more input data we would get and the more reliable a deep neural network would be able to recognize screws and this means that whenever someone is circling something and say something to the screw, maybe the voice recognition was not good enough, the deep learning could suggest or could even help generating the label because now we just use image recognition to or object recognition to generate the label there. For example, the helper draws a circle, the system would integrate these nouns as labels and feed that into a deep learning network, the image plus the label over time would be learned what objects have these labels look like and after a while someone could just click on objects and it would get automatically a label without saying anything if this is needed.

If the helper is in a very loud environment or if he is not able to have a microphone to really talk then he would be able to generate these annotations by typing in let's say, push this button and the system would use a kind of other completion of verbs to help the helper to formulate his request very quickly so he might want to type push this button as a help text that he wants to place somewhere into the environment and by knowing that he is doing annotations to help someone there might be a very limited vocabulary so we would be able to help very quickly, to come up very quickly with suggestions for as soon as he presses P that might be Push already there or press, because there is a limited vocabulary of verbs that he could use in this restricted environment, and then he could take this annotation and the same thing as here, he can take this annotation and drag it to the screen or take this sentence basically and drag it to the screen. The system would again look at the verbs and the nouns and would use the nouns as a label and would use the verbs as icons, interpret them as icons to make the user understanding what the helpee needs to do. So this would be even almost a non-verbal or non-audio communication possibility here as a small side effect of it.

So one of the problems that might occur is that over the time there will be more and more annotations on screen and the view and the whole thing is cluttered and some of the annotations are really not needed anymore because they were used in the past, and problem is really to figure out which one are still valid and useful and which one could be removed so that the screen is not cluttered anymore. And this is not such an easy problem because there could be a label somewhere that is a very, something that people would reference in, subsequently want to reference in the subsequent step or helping step or it could be something that was just used once and will never be used again. But what the system can do is, if for example there is a screw to be removed we can during the session that's going on if the screw is removed the system could again look at the annotation area and see if the system still recognizes a screw there and if not, then obviously this thing was removed and then the annotation doesn't make sense anymore and the system could automatically remove that. Thus, the system may use the learning, so the system is training this network from the kind of labeling input, and use the object recognition in several ways, one is to repeat from before, to maybe automatically create labels or help to easier create labels but also to remove labels if the object disappeared in the meantime. This is at regular intervals, the system can perform this. The system can perform a check of the visible annotations as were mentioned here.

The main aspects may include using sound plus the drawing at the same time, and the fact that it is occurring most likely at the same time. Voice recognition is one of the modalities that could help to improve user interfaces. In the shared augmented reality case, the users are naturally talking so there is no need to ask them to say anything to make that happen, they are doing it already because they want to inform the other party what to do and the system just uses that as an input to generate the label. The system kind of takes the input as it is and generates the label.

In some embodiments, during the conversation, the helpers might say something like, okay now that you have pressed that button, let's move on to the next step or something like that. And then the voice recognition might pick up on the fact that that step's been completed. And so based on that, would it make sense to remove the annotation. In some embodiments, leaving previous annotations on the screen would be more useful to reference in the future. The usefulness of leaving that annotation on there is good because the helpee could reference it later, or would there be cases where the helpee might want to remove those annotations even though the object still exists.

There may be a lot of audio going on actually and the system could try to analyze that in a general way and make sense of it, and try to kind of come up with some intelligent thing. The audio might not be related to the annotations but it might be, maybe not during the annotation but the helper is saying something about, again a button, and the system would be able to highlight all the buttons that the system learned to identify from previous shared augmented reality sessions so that while the helper is speaking there is temporarily things coming up and then this is helpful even more in a very specialized environment. For example, if this is a helper who helps an elevator repair person to repair the elevator, there may be a very specific vocabulary that they are talking about and one of, a youngster, a very new guy who's out there might not know the full vocabulary but as soon as the helper is saying something, if an object could kind of light up or could be, could get a little label in this way the helpee would be able to learn that vocabulary basically and it could be a temporarily label that shows up just during someone is speaking. This may improve the visual experience. In some embodiments, the labels may be warning labels, etc., like "be careful, this is hot, and we will tackle that afterwards." The system may keep these annotations and/or objects until the conditions no longer exist (e.g., identified by one or more sensors). Thus, some annotations might be really temporal and may be "released" by the users when not useful anymore.

In some embodiments, if the system can't recognize the object, the annotation may go away. The helper could conceivably tap on an annotation and say, get rid of it. The users and/or system may have the ability for the users to tap on something in the image and presumably have options to see what is be referred to based upon prior identifications. There may exist a limited vocabulary and this might really help so you would be able to have maybe a specific shared augmented reality version that is delivered to a company who's doing only elevator repairs, they have 100,000 repair guys out there because it is very service intensive business and they would have their own language basically so the system could kind of learn this specific vocabulary that they are using, a limited one. In some embodiments, the simple version of just clicking on it and then say, remove that.

Image recognition may also or instead be used to determine whether or not the user is performing an action. For example, if the helper said something like open that panel door, and then the user may be wearing augmented reality glasses, they open the door with the hand, that's something that's pretty easy to recognize from the video that the user has completed the action that's been requested by the helper. So if the voice recognition is sophisticated enough to annotate and know that the action to be performed is opening the panel then the system can visually confirm that that has happened.

In some embodiments, step by step instruction applications may include the next button and always a replay button of the step. The camera may be used to look at the situation and figure out what steps have been completed. In some embodiments, items may include an assembly state basically so you know how something is built and you would have the representation of the full thing so you can have any internal representation of the object and any assembly state. The system may be able to determine automatically which state it is. In some embodiments, the system may detect removal of parts or actions before they are instructed and may adapt the instruction session accordingly.

The system might be able to take a verbal command, verbal statement from the user or from the helpee and remove annotations or something based off that so open this panel, okay, open the panel and then maybe the system recognizes that and removes the annotation. In some embodiments, there is a verbal confirmation that the user's done an action and that's also a possibility that the system does not need to have a button but the user needs to make some action that he is finished with that side basically. In some embodiments, at the end of a particular step, all associated annotations may be removed. In some embodiments, one or more annotations may be selectively removed based on use selection. Thus, the system may generate labels and the labels may be fed into a deep neural network and using for object recognition and these labels could be in the other case, these labels could be generated also by typing and so in that case the system could be a little bit more open of how these labels are generated.

Environment-Indexed Database—Further Comments

In some embodiments, object recognition may be performed in a general case on a broad basis. For example, a user may hold his/her mobile phone toward any object in the world, in the best case and mobile phone should tell you what it is. One example of an approach that would analyze an image captured by the camera of the phone is training deep neural networks. A deep neural network may look at every pixel of an input image and try to learn by comparing the input image to labeled images into this network what the significant parts of the image are for a specific object. So you basically say, well there is an image, there is a car in it and this is an image there is no car in it, and there is another image with a car in it and there is another image there is no car in it, and it basically analyzes the pixels in a specific way and learns a way to distinguish images where cars are in and images where no cars are in.

Without using neural networks, the system may attempt to identify what is the specific thing that a car is made of, maybe it is a shape, so we should look at the shape first and then maybe it is a color, and maybe it is some features that are on the car and they try to detect that and, where it was handcrafted, basically, whereas the neural networks, they don't care. Neural networks may have some generic functions that they are starting to optimize, and therefore they don't care about very specific features that someone needs to tell or program for, they just learn about these features, what the most significant features are of the specific object. Neural networks may be the most promising approaches in the market to perform object recognition. Another way to do it is to use a location-based database. If you would know for each object where it is in the world, where it is GPS coordinate is, for example, then you would be able to walk around with a mobile phone, read the GPS coordinates and say well, in my vicinity there are these few objects because I know it is from my location-based database and I just try one after the other and try to match with these few that might be in my vicinity.

So these are two different concepts that may perform the object detection. If you think about a shared augmented reality session then you would basically have a remote assistant who is doing annotations in a three dimensional scene basically on the images and he would do that, he would do that by making a cross or a circle or an arrow pointing to a specific part of the image and then he might say something. The helper may annotate the image in some way so he is providing a label to a part of the image. Thus, during the shared augmented reality sessions, generated images have labels. And this is the most valuable source that you could have for a deep learning, as an input for deep learning because the biggest problem for training these deep learning networks is that you need images with labels. Someone needs to say hey, in this image there is a car and in this image there is no car. And having images with labels is a very, very valuable source to train these networks. And the idea here is to basically capture these images and together with the labels and use them for deep learning in this way and then we would use a neural network to recognize these objects afterwards and be able to label them automatically so this would be the one approach. The other approach is that we are, during a shared augmented reality session, generating a map which consists basically of features and this map is recognizable because of the features. The map may be stored together with the GPS coordinates from which it was captured, basically just recording the GPS coordinates of the shared augmented reality session plus the map that was generated during that session. This would allow us to go the other route, the other approach basically saying, okay, now we have a huge database after many, many shared augmented reality sessions around the world, we would have a huge database of these maps that basically describe features of objects plus their GPS coordinates.

Object recognition based on that approach when a user might want to recognize an object, the GPS coordinate from the mobile device may determine where he is at the moment, and may access the database which is a geolocation database that sorts the objects by its geolocation. All the objects that are around the user are delivered to the mobile device from the database and the mobile device may try then to match the features of these objects against the camera image and this way would recognize objects on a global scale. The information in the database may be generated by/in a shared augmented reality session such that the map and the labels that are associated to images as an input for a database that helps us to learn objects and subsequently identify these objects and recognize these objects from a later point. In some embodiments, the first and second approaches may be combined.

Maybe the user would want to recognize an object using their phone at some point and then they could use the GPS in that location data generated from a number of shared augmented reality sessions in recognizing that object. But you wouldn't necessarily need any neural network.

The user could either use the GPS coordinates plus the features to say, find this object or you could just take the image and go into your network and ask the neural network what am I seeing, and both would give you a response in a positive case. So this means that you can describe them as completely independent approaches but you also could combine both and say okay, I am asking both and when they overlap you deliver the result, it is even more, it would even deliver a more reliable thing. But from a concept point of view they might be completely separate. The nice thing is they are both generating the data at the same time during a shared augmented reality session.

The database may store the map as soon as the shared augmented reality session is finished because this is the most complete description of the environment and the longer that the helpee is running around with his camera, he is basically adding for every frame that he is basically capturing has the potential to add to the map and make it bigger and make it more reliable. And so you would store the map at the end of a shared augmented reality session and the labeled images, you would store those as soon as the helper is making an annotation. When the helper is making an annotation and is adding a label to it, either typing it, verbal, or there might be different ways of doing that but as soon as he is providing a label you would have basically the underlying image plus the label and this way you would store that. This could occur multiple times for one shared augmented reality session.

Once an annotation is made, at least for the deep neural network case, the user could take any image of the shared augmented reality session that includes that label and then that image could be used for training for a deep neural network.

Aspects of Various Embodiments

A method can be performed by a portable computing device having a processing unit, a memory, and a camera. The method can include: capturing an image with the camera; detecting an object within the captured image based on a database record for the object within a database of objects; based on the database record, retrieving an identifier for initiating a live communication with a remote party; in response to the retrieving the identifier, presenting, in association with an indication that the object has been detected, a user option to initiate the live communication with the remote party; and in response to receiving user input, initiating the live communication between the device and the remote party based on the identifier. The live communication can include one or more of: voice, video, and text messaging. The live communication can include a live video stream captured by the camera of the device. The method can further include: transmitting first augmented reality (AR) graphics generated by the device to the remote party along with the live video stream to be displayed by a remote computer system; receiving second AR graphics from the remote party via the remote computer system; and displaying the second AR graphics overlaid on the live video stream captured by the camera of the device on a display of the device. The detecting the object can include: determining a shape of the object based on the captured image; and matching the shape of the object to a stored shape associated with the record for the object. The detecting the object can include: scanning a machine-readable code disposed on the object within the image; and dereferencing the machine-readable code using the database. The method can further include: based on the database record, displaying on a display of the device an expected location of a graphical marking on the object as augmented reality graphics overlaid on a live video stream captured by the camera of the device; scanning the graphical marking with the camera, wherein the graphical marking encodes additional information about the object; and transmitting the additional information to the remote party. The database can further include user instructions for interacting with the object associated with the record for the detected object. The method can further include displaying the user instructions via the display. The database can be located on a remote server. The database can be located on the device.

A method can be performed by a system including a first portable computing device having a processing unit, a memory, and a camera. The method can include: the first device capturing a first image of at least a portion of an object; accessing a first database having a plurality of records storing characteristic data for identifying objects based on captured images; locating a first matching record within the first database based on the first image; accessing a second database having a plurality of records storing identifiers for initiating communication sessions; using the first matching record within the first database to locate a second matching record in the second database; retrieving an identifier for initiating a communication session from the second matching record; and using the identifier for initiating a communication session to initiate a live communication session between the first device and a second device. The first matching record can include an identifier of the object. The second matching record can be located based on the identifier of the object. The object can include a machine-readable code captured in the first image. The machine-readable code can have a format defined in the first matching record. The method can further include decoding the machine-readable code using the format. The communication session can include the first device sending a live video stream, captured by the first device, to the second device. The method can further include: capturing a second image of at least a portion of the object with the first device, wherein the second image includes a machine-readable code; decoding the machine-readable code; and the first device transmitting the decoded machine-readable code to the second device within the communication session.

A method can include: initiating an AR video session using a camera and a display on a first device operated by a first user; identifying an object within a field of view of the camera; performing motion tracking using the identified object within the field of view of the camera during the AR video session; accessing a database having a plurality of records storing identifiers for initiating communication sessions; using the identification of the object to locate a matching record in the database; obtaining an identifier for initiating a communication session from the matching record; based on the identifier for initiating a communication session, presenting to the first user, during the AR video session, an option to initiate a person-to-person communication session; and in response to selection of the option by the user, using the identifier for initiating a communication session to initiate a person-to-person communication session between the first user operating the first device and a second user operating a second device. The communication session can include the first device sending to the second device a live video stream representing the AR video session. The communication session can include the second device sending AR graphics, specified by the second user during the communication session, to the first device, wherein the AR graphics are displayed on the first device in motion relative to the object in the field of view. The object can include a machine-readable code, and the identifying the object can be performed using the machine-readable code. The motion tracking can be performed using the machine-readable code.

A method of sharing a user interface between first and second mobile devices can include: receiving a selection of an instructional sequence from a user with the first mobile device; transmitting data indicative of the selected instructional sequence from the first mobile device to the second mobile device; in response to receiving the data indicative of the selected instructional sequence: capturing a first sequence of images with a camera of the second mobile device, detecting an object within the first sequence of images, the detected object being identified by the selected instructional sequence, tracking the object within the first sequence of images, and displaying the instructional sequence overlaid on the first sequence of images with a display of the second mobile device. The first mobile device can be or include a handheld mobile device and the second mobile device can be or include a head mounted display. The first mobile device can include a touch screen configured to receive input from the user, and the second mobile device can include an auxiliary input device, different from the touch screen, configured to receive input from the user. The instructional sequence can include a set of repair instructions for repairing the object. The method can further include receiving a voice command from the user to navigate the instructional sequence with a microphone of the second mobile device. The method can further include: transmitting data indicative of completion of the instructional sequence from the second mobile device to the first mobile device; and receiving user input related to the completed instructional sequence from the user with the first mobile device. The method can further include: capturing a second sequence of images with a camera of the first mobile device; detecting the object within the second sequence of images; and displaying a plurality of instructional sequences associated with the detected object with a display of the first mobile device, wherein the selection of the instructional sequence received from the user is in response to displaying the plurality of instructional sequences associated with the detected object. The displaying the instructional sequence can include: establishing a connection between the second mobile device and a remote individual; receiving, at the second mobile device, at least a portion of the instructional sequence via the connection with the remote individual; and displaying the received portion of the instructional sequence overlaid on the first sequence of images with the display of the second mobile device. The received portion of the instructional sequence can include an annotation anchored to the tracked object. The method can further include receiving administrative data from the user associated with the selected instructional sequence with the first mobile device prior to transmitting the data indicative of the selected instructional sequence to the second mobile device.

A head mounted display (HMD) can include: a display configured to display images; a camera; a processor; and a memory in communication with the processor and having stored thereon computer-executable instructions to cause the processor to: receive data indicative of a selected instructional sequence from a mobile device, the instructional sequence being received at the mobile device based on a user selection, capture a first sequence of images with the camera in response to receiving the data indicative of the selected instructional sequence, detect an object within the first sequence of images, the detected object being identified by the selected instructional sequence, track the object within the first sequence of images, and display the instructional sequence overlaid on the first sequence of images with the display. The mobile device can include a touch screen configured to receive input from the user, and the HMD can include an auxiliary input device, different from the touch screen, configured to receive input from the user. The HMD can include a semi-transparent display screen configured to display the images in a semi-transparent manner. The HMD can further include a microphone, wherein the memory further has stored thereon computer-executable instructions to cause the processor to receive a voice command from the user to navigate the instructional sequence with the microphone. The memory can further have stored thereon computer-executable instructions to cause the processor to: establish a connection with a remote individual, receive at least a portion of the instructional sequence via the connection with the remote individual, and display the received portion of the instructional sequence overlaid on the first sequence of images with the display.

A non-transitory computer readable storage medium can have stored thereon instructions that, when executed by a processor, cause a HMD to: receive data indicative of a selected instructional sequence from a mobile device, the instructional sequence being received at the mobile device based on a user selection; capture a first sequence of images with a camera of the HMD in response to receiving the data indicative of the selected instructional sequence; detect an object within the first sequence of images, the detected object being identified by the selected instructional sequence; track the object within the first sequence of images; and display the instructional sequence overlaid on the first sequence of images with a display of the HMD. The mobile device can include a touch screen configured to receive input from the user and the HMD can include an auxiliary input device, different from the touch screen, configured to receive input from the user. The instructional sequence can include a set of repair instructions for repairing the tracked object. The non-transitory computer readable storage medium can further have stored thereon instructions that, when executed by the processor, cause the HMD to receive a voice command from the user to navigate the instructional sequence with a microphone of the HMD. The non-transitory computer readable storage can further have stored thereon instructions that, when executed by the processor, cause the HMD to: establish a connection with a remote individual; receive at least a portion of the instructional sequence via the connection with the remote individual; and display the received portion of the instructional sequence overlaid on the first sequence of images with the display.

A method of person-to-person communication session playback can include: initiating a person-to-person communication session between a first device operated by a first user and a second device operated by a second user; capturing a live video stream with a camera of the first device during the communication session; sending at least a portion of the live video stream from the first device to the second device; receiving with the first device at least one audio-visual communication specified by the second user during the communication session; providing the audio-visual communication to the first user via an output device of the first device; and storing the audio-visual communication for playback to a third user of a third device outside of a person-to-person communication session. The audio-visual communication can be stored independent of a viewing position of the first device. The method can further include: generating a three-dimensional (3D) reconstruction of a first environment of the first device from the live video stream during the communication session; and storing the 3D reconstruction of the first environment for the playback to the third user. The 3D reconstruction of the first environment can include a plurality of feature points derived from the live video stream, the feature points enabling the tracking of a second environment during playback of the audio-visual communication with the third device. The method can further include: detecting a first object within the live video stream; and anchoring the audio-visual communication to the detected first object, wherein the storing of the audio-visual communication includes storing an indication of the anchoring of the audio-visual communication to the detected first object independent of the live video stream. The method can further include: initiating a playback session for the third user outside of the person-to-person communication session; capturing an image with a camera of the third device; detecting a second object with the captured image, the second object being the same as or similar to the first object; and displaying the audio-visual communication anchored to the detected second object. The audio-visual communication can include at least one of: a verbal instructions and a graphical annotation. The method can further include initiating a playback session for the third user in a virtual environment outside of the person-to-person communication session. The person-to-person communication session can include an augmented reality video session. The method can further include: detecting a period of time during the communication session in which the first device does not receive any audio-visual communication specified by the second user; and marking the period of time such that the period of time is not included in playback of the communication session.

A first device for person-to-person communication session playback can include: a camera; an output device; a processor; and a memory in communication with the processor and having stored thereon computer-executable instructions to cause the processor to: initiate a person-to-person communication session between the first device operated by a first user and a second device operated by a second user; capture a live video stream with the camera during the communication session; send at least a portion of the live video stream to the second device; receive at least one audio-visual communication specified by the second user during the communication session; provide the audio-visual communication to the first user via the output device; and store the audio-visual communication in the memory for playback to a third user of a third device outside of a person-to-person communication session. The audio-visual communication can be stored independent of a viewing position of the first device. The memory can further have stored thereon computer-executable instructions to cause the processor to: generate a three-dimensional (3D) reconstruction of a first environment of the first device from the live video stream during the communication session; and store the 3D reconstruction of the first environment in the memory for the playback to the third user. The 3D reconstruction of the first environment can include a plurality of feature points derived from the live video stream, the feature points enabling the tracking of a second environment during playback of the audio-visual communication with the third device. The memory can further have stored thereon computer-executable instructions to cause the processor to: detect a first object within the live video stream; and anchor the audio-visual communication to the detected first object, wherein the storing of the audio-visual communication includes storing an indication of the anchoring of the audio-visual communication to the detected first object independent of the live video stream.

A non-transitory computer readable storage medium can have stored thereon instructions that, when executed by a processor, cause a first device to: initiate a person-to-person communication session between the first device operated by a first user and a second device operated by a second user; capture a live video stream with a camera of the first device during the communication session; send at least a portion of the live video stream from the first device to the second device; receive at least one audio-visual communication specified by the second user during the communication session; provide the audio-visual communication to the first user via an output device of the first device; and store the audio-visual communication in the memory for playback to a third user of a third device outside of a person-to-person communication session. The audio-visual communication can be stored independent of a viewing position of the first device. The non-transitory computer readable storage medium can further have stored thereon instructions that, when executed by the processor, cause the first device to: generate a three-dimensional (3D) reconstruction of a first environment of the first device from the live video stream during the communication session; and store the 3D reconstruction of the first environment in the memory for the playback to the third user. The 3D reconstruction of the first environment can include a plurality of feature points derived from the live video stream, the feature points enabling the tracking of a second environment during playback of the audio-visual communication with the third device. The non-transitory computer readable storage medium can further have stored thereon instructions that, when executed by the processor, cause the first device to: detect a first object within the live video stream; and anchor the audio-visual communication to the detected first object, wherein the storing of the audio-visual communication includes storing an indication of the anchoring of the audio-visual communication to the detected first object independent of the live video stream.

CONCLUSION

Implementations disclosed herein provide systems, methods and apparatus for initiating communication between two electronic devices based on the detection of an object as well as for other disclosed purposes.

The methods disclosed herein comprise one or more steps or actions for achieving described methods. Method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

As used herein, the term "plurality" denotes two or more. For example, a plurality of components indicates two or more components. The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like. The phrase "based on" does not mean "based only on," unless expressly specified otherwise. In other words, the phrase "based on" describes both "based only on" and "based at least on."

Although the subject matter has been described in terms of certain embodiments, other embodiments, including embodiments which may or may not provide various features and advantages set forth herein will be apparent to those of ordinary skill in the art in view of the foregoing disclosure. The specific embodiments described above are disclosed as examples only, and the scope of the patented subject matter is defined by the claims that follow.

In the claims, the terms "based upon" or "based on" shall include situations in which a factor is taken into account directly and/or indirectly, and possibly in conjunction with other factors, in producing a result or effect. In the claims, a portion shall include greater than none and up to the whole of a thing.

The invention claimed is:

1. A method of person-to-person communication session playback, the method comprising:
   initiating a person-to-person communication session between a first device operated by a first user and a second device operated by a second user;
   capturing a live video stream with a camera of the first device during the communication session;
   sending at least a portion of the live video stream from the first device to the second device;
   receiving with the first device at least one audio-visual communication specified by the second user during the communication session;
   providing the audio-visual communication to the first user via an output device of the first device;
   storing the audio-visual communication for playback to a third user of a third device outside of a person-to-person communication session;
   detecting a period of time during the communication session in which the first device does not receive any audio-visual communication specified by the second user; and
   marking the period of time such that the period of time is not included in playback of the communication session.

2. The method of claim 1, wherein the audio-visual communication is stored independent of a viewing position of the first device.

3. The method of claim 1, further comprising:
   generating a three-dimensional (3D) reconstruction of a first environment of the first device from the live video stream during the communication session; and
   storing the 3D reconstruction of the first environment for the playback to the third user.

4. The method of claim 3, wherein the 3D reconstruction of the first environment comprises a plurality of feature points derived from the live video stream, the feature points enabling the tracking of a second environment during playback of the audio-visual communication with the third device.

5. The method of claim 1, further comprising:
detecting a first object within the live video stream; and
anchoring the audio-visual communication to the detected first object,
wherein the storing of the audio-visual communication comprises storing an indication of the anchoring of the audio-visual communication to the detected first object independent of the live video stream.

6. The method of claim 5, further comprising:
initiating a playback session for the third user outside of the person-to-person communication session;
capturing an image with a camera of the third device;
detecting a second object with the captured image, the second object being the same as or similar to the first object; and
displaying the audio-visual communication anchored to the detected second object.

7. The method of claim 1, wherein the audio-visual communication comprises at least one of: a verbal instructions and a graphical annotation.

8. The method of claim 1, further comprising initiating a playback session for the third user in a virtual environment outside of the person-to-person communication session.

9. The method of claim 1, wherein the person-to-person communication session comprises an augmented reality video session.

10. A first device for person-to-person communication session playback, the device comprising:
a camera;
an output device;
a processor; and
a memory in communication with the processor and having stored thereon computer-executable instructions to cause the processor to:
initiate a person-to-person communication session between the first device operated by a first user and a second device operated by a second user;
capture a live video stream with the camera during the communication session;
send at least a portion of the live video stream to the second device;
receive at least one audio-visual communication specified by the second user during the communication session;
provide the audio-visual communication to the first user via the output device;
store the audio-visual communication in the memory for playback to a third user of a third device outside of a person-to-person communication session;
detect a period of time during the communication session in which the first device does not receive any audio-visual communication specified by the second user; and
mark the period of time such that the period of time is not included in playback of the communication session.

11. The first device of claim 10, wherein the audio-visual communication is stored independent of a viewing position of the first device.

12. The first device of claim 10, wherein the memory further has stored thereon computer-executable instructions to cause the processor to:
generate a three-dimensional (3D) reconstruction of a first environment of the first device from the live video stream during the communication session; and
store the 3D reconstruction of the first environment in the memory for the playback to the third user.

13. The first device of claim 12, wherein the 3D reconstruction of the first environment comprises a plurality of feature points derived from the live video stream, the feature points enabling the tracking of a second environment during playback of the audio-visual communication with the third device.

14. The first device of claim 10, wherein the memory further has stored thereon computer-executable instructions to cause the processor to:
detect a first object within the live video stream; and
anchor the audio-visual communication to the detected first object,
wherein the storing of the audio-visual communication comprises storing an indication of the anchoring of the audio-visual communication to the detected first object independent of the live video stream.

15. A non-transitory computer readable storage medium having stored thereon instructions that, when executed by a processor, cause a first device to:
initiate a person-to-person communication session between the first device operated by a first user and a second device operated by a second user;
capture a live video stream with a camera of the first device during the communication session;
send at least a portion of the live video stream from the first device to the second device;
receive at least one audio-visual communication specified by the second user during the communication session;
provide the audio-visual communication to the first user via an output device of the first device;
store the audio-visual communication in the memory for playback to a third user of a third device outside of a person-to-person communication session;
detect a period of time during the communication session in which the first device does not receive any audio-visual communication specified by the second user; and
mark the period of time such that the period of time is not included in playback of the communication session.

16. The non-transitory computer readable storage medium of claim 15, wherein the audio-visual communication is stored independent of a viewing position of the first device.

17. The non-transitory computer readable storage medium of claim 15, further having stored thereon instructions that, when executed by the processor, cause the first device to:
generate a three-dimensional (3D) reconstruction of a first environment of the first device from the live video stream during the communication session; and
store the 3D reconstruction of the first environment in the memory for the playback to the third user.

18. The non-transitory computer readable storage medium of claim 17, wherein the 3D reconstruction of the first environment comprises a plurality of feature points derived from the live video stream, the feature points enabling the tracking of a second environment during playback of the audio-visual communication with the third device.

19. The non-transitory computer readable storage medium of claim 15, further having stored thereon instructions that, when executed by the processor, cause the first device to:
detect a first object within the live video stream; and
anchor the audio-visual communication to the detected first object,
wherein the storing of the audio-visual communication comprises storing an indication of the anchoring of the audio-visual communication to the detected first object independent of the live video stream.

* * * * *